(12) United States Patent
Da Silva et al.

(10) Patent No.: US 12,549,977 B2
(45) Date of Patent: Feb. 10, 2026

(54) INTER-CELL GROUP MESSAGES FOR USER EQUIPMENT OPERATING IN MULTI-CONNECTIVITY

(71) Applicant: Telefonaktiebolaget LM Ericsson (publ), Stockholm (SE)

(72) Inventors: Icaro Leonardo Da Silva, Solna (SE); Jens Bergqvist, Linköping (SE); Joakim Axmon, Limhamn (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 336 days.

(21) Appl. No.: 18/022,907

(22) PCT Filed: Sep. 27, 2021

(86) PCT No.: PCT/SE2021/050943
§ 371 (c)(1),
(2) Date: Feb. 23, 2023

(87) PCT Pub. No.: WO2022/086387
PCT Pub. Date: Apr. 28, 2022

(65) Prior Publication Data
US 2023/0319607 A1      Oct. 5, 2023

Related U.S. Application Data

(60) Provisional application No. 63/093,651, filed on Oct. 19, 2020.

(51) Int. Cl.
*H04W 76/10*      (2018.01)
*H04W 24/08*      (2009.01)

(52) U.S. Cl.
CPC .................................. *H04W 24/08* (2013.01)

(58) Field of Classification Search
CPC ..... H04L 5/001; H04L 5/0048; H04L 5/0098; H04L 27/0006; H04W 24/08;
(Continued)

(56) References Cited

U.S. PATENT DOCUMENTS

9,439,233 B2 *   9/2016   Kwon ................... H04W 76/27
10,397,975 B2 *  8/2019   Kwon ..................... H04L 5/001
(Continued)

OTHER PUBLICATIONS

"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, pp. 1-366.
(Continued)

*Primary Examiner* — Frank Duong
(74) *Attorney, Agent, or Firm* — Murphy, Bilak & Homiller, PLLC

(57) ABSTRACT

Methods and apparatus for a user equipment, UE, configured for dual connectivity, DC, with a wireless network via a first node arranged to provide a first cell group and a second node arranged to provide a second cell group. Such methods and apparatuses include receiving (1620) a first medium access control, MAC, message from the first node by a first UE MAC entity associated with the first cell group, and determining (1630) that the first MAC message includes an encapsulated second MAC message for a second UE MAC entity associated with the second cell group, which is deactivated. Such methods and apparatuses also include performing (1640) one or more operations related to the second cell group based on the second MAC message.

21 Claims, 16 Drawing Sheets

(58) Field of Classification Search
CPC . H04W 52/0225; H04W 76/11; H04W 76/16; H04W 76/27; Y02D 30/70

See application file for complete search history.

(56) References Cited

U.S. PATENT DOCUMENTS

| | | | |
|---|---|---|---|
| 10,772,008 B2 | 9/2020 | Park et al. | |
| 11,206,707 B2* | 12/2021 | Deogun | H04W 76/16 |
| 11,973,638 B2* | 4/2024 | Cirik | H04L 41/0677 |
| 2015/0215929 A1 | 7/2015 | Damnjanovic et al. | |
| 2018/0054814 A1 | 2/2018 | Zhang et al. | |
| 2020/0092814 A1 | 3/2020 | Zhou et al. | |
| 2020/0259601 A1 | 8/2020 | Zhou et al. | |
| 2023/0337020 A1* | 10/2023 | Da Silva | H04W 24/04 |

OTHER PUBLICATIONS

"3GPP TS 38.321 V16.2.0", 3rd Generation Partnership Project; Technical Specification Group Radio Access Network; NR; Medium Access Control (MAC) protocol specification (Release 16), Sep. 2020, pp. 1-107.

"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.

"3GPP TS 37.340 V16.2.0", 3rd Generation Partnership Project; Technical Specification Group Radio Access Network; Evolved Universal Terrestrial Radio Access (E-UTRA) and NR; Multi-connectivity; Stage 2 (Release 16), Jul. 2020, pp. 1-78.

"3GPP TS 38.423 V16.2.0", 3rd Generation Partnership Project; Technical Specification Group Radio Access Network; NG-RAN; Xn application protocol (XnAP) (Release 16), Jul. 2020, pp. 1-447.

"3GPP TS 38.214 V16.3.0", 3rd Generation Partnership Project; Technical Specification Group Radio Access Network; NR; Physical layer procedures for data (Release 16), Sep. 2020, pp. 1-166.

"3GPP TS 38.321 V16.1.0", 3rd Generation Partnership Project; Technical Specification Group Radio Access Network; NR; Radio Resource Control (RRC) protocol specification (Release 16), Jul. 2020, pp. 1-151.

"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.

"3GPP TS 23.501 V16.6.0", 3rd Generation Partnership Project; Technical Specification Group Services and System Aspects; System architecture for the 5G System (5GS); Stage 2 (Release 16), Sep. 2020, pp. 1-447.

China Telecom, "Views on NR Rel-17", 3GPP TSG RAN Meeting #84, RP-190919, Newport Beach, USA, Jun. 4, 2019, pp. 1-36.

"Report of 3GPP TSG RAN2#107bis meeting, Chongqing, China", 3GPP TSG-RAN WG2 meeting #108, R2-1914301, Oct. 14-18, 2019, pp. 1-283.

"Revised WID on Further Multi-RAT Dual-Connectivity enhancements", 3GPP TSG RAN Meeting #88e, RP-201040, (revision of RP-193249), Electronic Meeting, Jun. 29-Jul. 3, 2020, pp. 1-4.

"Introducing suspension of SCG", 3GPP TSG RAN WG2 Meeting #107, R2-1908679, Prague, Czech, Aug. 26-30, 2019, pp. 1-4.

* cited by examiner

Fig. 7F

| A/D | SRS Resource Set's Cell ID | | | | Oct 1 |
|---|---|---|---|---|---|
| R | R | C | SUL | SP SRS Resource Set ID | Oct 2 |
| $F_0$ | Resource $ID_0$ | | | | Oct 3 |
| ... | | | | | |
| $F_{M-1}$ | Resource $ID_{M-1}$ | | | | Oct N-M |
| R | Resource Serving Cell $ID_0$ | | | Resource BWP $ID_0$ | Oct N-M+1 |
| ... | | | | | |
| R | Resource Serving Cell $ID_{M-1}$ | | | Resource BWP $ID_{M-1}$ | Oct N |

(SRS Resource Set's BWP ID)

Fig. 7G

| CORESET Pool ID | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| ... | | | | | | | | |
| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |

Fig. 7H

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| ... | | | | | | | | |
| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |

INTER-CELL GROUP MESSAGES FOR USER EQUIPMENT OPERATING IN MULTI-CONNECTIVITY

TECHNICAL FIELD

The present disclosure relates to wireless communication networks in general and more specifically to techniques that reduce energy consumed by a user equipment (UE) when connected to multiple cell groups in a wireless network, particularly when one of the cell groups is in a deactivated state.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

Logical channel communications between a UE and an eNB are via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB. 3GPP Rel-10 supports bandwidths larger than 20 MHz. One important Rel-10 requirement is backward compatibility with Rel-8. As such, a wideband LTE Rel-10 carrier (e.g., >20 MHz) should appear as a plurality of carriers ("component carriers" or CCs) to a Rel-8 ("legacy") terminal. Legacy terminals can be scheduled in all parts of the wideband Rel-10 carrier. One way to achieve this is by Carrier Aggregation (CA), whereby a Rel-10 terminal can receive multiple CCs, each preferably having the same structure as a Rel-8 carrier.

LTE dual connectivity (DC) was introduced in Rel-12. In DC operation, a UE in RRC_CONNECTED state consumes radio resources provided by at least two different network points connected to one another with a non-ideal backhaul. In LTE, these two network points may be referred to as a "Master eNB" (MeNB) and a "Secondary eNB" (SeNB). More generally, the terms master node (MN), anchor node, and MeNB can be used interchangeably, while the terms secondary node (SN), booster node, and SeNB can also be used interchangeably. DC can be viewed as a special case of CA, in which the aggregated carriers (or cells) are provided by network nodes that are physically separated and not connected via a robust, high-capacity connection.

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. 5G/NR technology shares many similarities with fourth-generation LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC_CONNECTED states, but adds another state known as RRC_INACTIVE. In addition to providing coverage via "cells," as in LTE, NR networks also provide coverage via "beams." In general, a DL "beam" is a coverage area of a network-transmitted RS that may be measured or monitored by a UE.

DC is also envisioned as an important feature for 5G/NR networks. Several DC (or more generally, multi-connectivity) scenarios have been considered for NR. These include NR-DC that is similar to LTE-DC discussed above, except that both the MN and SN (referred to as "gNBs") employ the NR interface to communicate with the UE. In addition, various multi-RAT DC (MR-DC) scenarios have been considered, whereby a UE can be configured to uses resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

In order to improve network energy efficiency and battery life for UEs in MR-DC, 3GPP Rel-17 includes a work item for efficient SCG/SCell activation/deactivation. This can be especially important for MR-DC configurations with NR SCG since it has been found that, in some cases, NR UE energy consumption is three-to-four times higher than in LTE.

SUMMARY

When the UE's SCG is deactivated (or, more generally, in a reduced-energy mode such as SCG suspended, SCG dormant, etc.), one possible way to reduce UE energy consumption is to refrain from monitoring physical downlink control channel (PDCCH) on the deactivated SCG. However, this can cause various problems, issues, and/or difficulties, particularly in relation to delays for subsequent activation of the SCG.

Embodiments of the present disclosure provide specific improvements to UE operation with multiple cell groups in a wireless network, such as by facilitating solutions to overcome exemplary problems summarized above and described in more detail below.

Embodiments include methods (e.g., procedures) for a UE configured for DC with a wireless network via a first node arranged to provide a first cell group and a second node arranged to provide a second cell group. These exemplary methods can be performed by a UE (e.g., wireless device, IoT device, modem, etc. or component thereof).

In some embodiments, these exemplary methods can include receiving a first MAC message from the first node by a first UE MAC entity associated with the first cell group; and determine that the first MAC message includes an encapsulated second MAC message for a second UE MAC entity associated with the second cell group, which is deactivated. These exemplary methods can also include performing one or more operations related to the second cell group based on the second MAC message.

In some of these embodiments, performing the one or more operations can include any of the following: sending (i.e., by the first UE MAC entity) an acknowledgement of the first MAC message that includes an encapsulated acknowledgement of the second MAC message; sending an indication to UE lower layers to prepare for operations in the second cell group; and receiving one or more signals transmitted by the second node in the second cell group.

In some of these embodiments, the one or more operations related to the second cell group can be performed with a second delay. In such embodiments, these exemplary methods can also include receiving a third MAC message from the first node by the first UE MAC entity and performing one or more further operations related to the first cell group based on the third MAC message. The one or more further operations related to the first cell group can be performed with a first delay that is less than the second delay. In some embodiments, the difference between the first delay and the second delay can be predetermined or previously configured by the first node.

In some of these embodiments, these exemplary methods can also include receiving, from the first node, an indicator that the first MAC message includes the encapsulated second MAC message. In such embodiments, determining that the first message includes the encapsulated second message can be based on the indicator.

In other embodiments, these exemplary methods can include the following: performing one or more operations that create a need to transmit a second MAC message by a second UE MAC entity associated with the second cell group, which is deactivated; generating (i.e., by a first UE MAC entity associated with the first cell group) a first MAC message that encapsulates the second MAC message; and sending (i.e., by the first UE MAC entity) the first MAC message to the first node.

In some of these embodiments, performing the one or more operations can include detecting a beam failure in a cell of the second cell group. In some of these embodiments, these exemplary methods can also include sending, to the first node, an indicator that the first MAC message includes the encapsulated second MAC message.

In various embodiments, the indicator can be included in one of the following:
- the first MAC message;
- a further MAC message, sent or received before the first MAC message, that indicates one or more subsequent MAC message elements are associated with the second cell group; or
- DCI that schedules UE reception of the first MAC message.

In some variants, the one or more subsequent MAC message elements can include one or more of the following: sub-protocol data units (PDUs), control elements (CEs), service data units (SDUs).

In some variants, the indicator includes one or more of the following:
- a logical channel identifier (LCID), which indicates that one or more subsequent MAC message elements are associated with the second cell group;
- an indication of how many subsequent MAC message elements are associated with the second cell group;
- an identifier of the second cell group; and
- an indication of which subsequent MAC message elements are associated with the respective first and second cell groups.

In some embodiments, the second MAC message can include one or more of the following: an identifier of the second cell group; an identifier of the UE in relation to the second cell group; and an identifier of the UE in relation to a UE MAC entity associated with the second cell group.

In some embodiments, the first MAC message is a first MAC CE, the second MAC message is a second MAC CE, and the first MAC CE also includes an LCID that indicates the first MAC CE includes the second MAC CE.

In some embodiments, the first MAC message is a first MAC sub-PDU and the second MAC message is a second MAC sub-PDU. The first MAC sub-PDU also includes a first MAC subheader that includes an LCID that indicates the first MAC sub-PDU includes the second MAC sub-PDU associated with the second UE MAC entity. Likewise, the second MAC sub-PDU includes a second MAC subheader and a MAC CE or a MAC SDU associated with the second UE MAC entity. An example of these embodiments is shown in FIG. 13.

Other embodiments include methods (e.g., procedures) for a first node, of a wireless network, arranged to provide a first cell group to a UE configured for DC with a second node arranged to provide a second cell group to the UE. These exemplary methods can be performed by a network node (e.g., base station, eNB, gNB, ng-eNB, en-gNB, etc., or components thereof).

In some embodiments, these exemplary methods can include receiving a second MAC message for the UE from the second node. The second MAC message is associated with the second cell group, which is deactivated. These exemplary methods can also include generating a first MAC message for the UE that encapsulates the second MAC message, and sending the first MAC message to the UE via the first cell group.

In some of these embodiments, these exemplary methods can also include receiving, from the UE, an acknowledgement of the first MAC message that includes an encapsulated acknowledgement of the second MAC message; and sending the acknowledgement of the second MAC message to the second node.

In some of these embodiments, these exemplary methods can also include sending, to the UE, an indicator that the first MAC message includes the encapsulated second MAC message.

In other embodiments, these exemplary methods can include the following operations: receiving a first MAC message via the first cell group; determining that the first MAC message includes an encapsulated second MAC message associated with the second cell group, which is deactivated; and sending the second MAC message to the second node.

In some of these embodiments, these exemplary methods can also include sending the UE an acknowledgement of the first MAC message via the first cell group. In some variants, these exemplary methods can also include receiving an acknowledgement of the second MAC message from the second node and encapsulating the acknowledgement of the second MAC message into the acknowledgement of the first MAC message sent to the UE.

In some of these embodiments, these exemplary methods can also include receiving, from the UE, an indicator that the first MAC message includes the encapsulated second MAC message. In such case, determining that the first MAC message includes the encapsulated second MAC message is based on the indicator.

In various embodiments, the first MAC message and the second MAC message can have any of the same properties, characteristics, and/or content summarized above for UE embodiments.

In various embodiments, the indicator (sent or received) can have any of the same properties, characteristics, and/or content summarized above for UE embodiments.

Other embodiments include methods (e.g., procedures) for a second node, of a wireless network, arranged to provide a second cell group to a UE configured for DC with a first node arranged to provide a first cell group to the UE. These exemplary methods can be performed by a network node (e.g., base station, eNB, gNB, ng-eNB, en-gNB, etc., or components thereof).

In some embodiments, these exemplary methods can include performing one or more operations that create a need to transmit, to the UE, a second MAC message associated with the second cell group; and sending the second message to the first node. The second cell group is deactivated. In some of these embodiments, these exemplary methods can also include receiving, from the first node, an acknowledgement of the second MAC message by the UE.

In other embodiments, these exemplary methods can include receiving, from the first node, a second MAC message sent by the UE. The second MAC message is associated with the second cell group, which is deactivated. These exemplary methods can also include performing one or more operations related to the second cell group based on the second message.

In some of these embodiments, performing the one or more operations can include any of the following: sending, to the first node, an acknowledgement of the second MAC message; sending an indication to second node lower layers to prepare for operations in the second cell group; and transmitting one or more signals for the UE in the second cell group.

In various embodiments, the second MAC message can have any of the same properties, characteristics, and/or content summarized above for UE embodiments.

In any of the above-described embodiments, the first node can be a master node (MN), the first cell group can be a master cell group (MCG), the second node can be a secondary node (SN), and the second cell group can be a secondary cell group (SCG).

Other embodiments include UEs (e.g., wireless devices, IoT devices, etc. or component(s) thereof) or network nodes (e.g., base stations, eNBs, gNBs, ng-eNBs, en-gNBs, etc., or components thereof) configured to perform operations corresponding to any of the exemplary methods described herein. Other embodiments include non-transitory, computer-readable media storing program instructions that, when executed by processing circuitry, configure UEs or network nodes to perform operations corresponding to any of the exemplary methods described herein.

These and other embodiments described herein can enable and/or facilitate a UE to transmit/receive a MAC message for a deactivated cell group (e.g., SCG) in another activated cell group (e.g., MCG), thereby reducing UE energy consumption by allowing the UE to refrain from monitoring a control channel of the deactivated cell group (e.g., SCG PDCCH). At the same time, by transmitting/received such MAC messages via the other cell group, the UE is prepared to (re-)activate or resume the deactivated cell group without excess delay.

These and other objects, features, and advantages of embodiments of the present disclosure will become apparent upon reading the following Detailed Description in view of the Drawings briefly described below.

DETAILED DESCRIPTION

Figure 1:
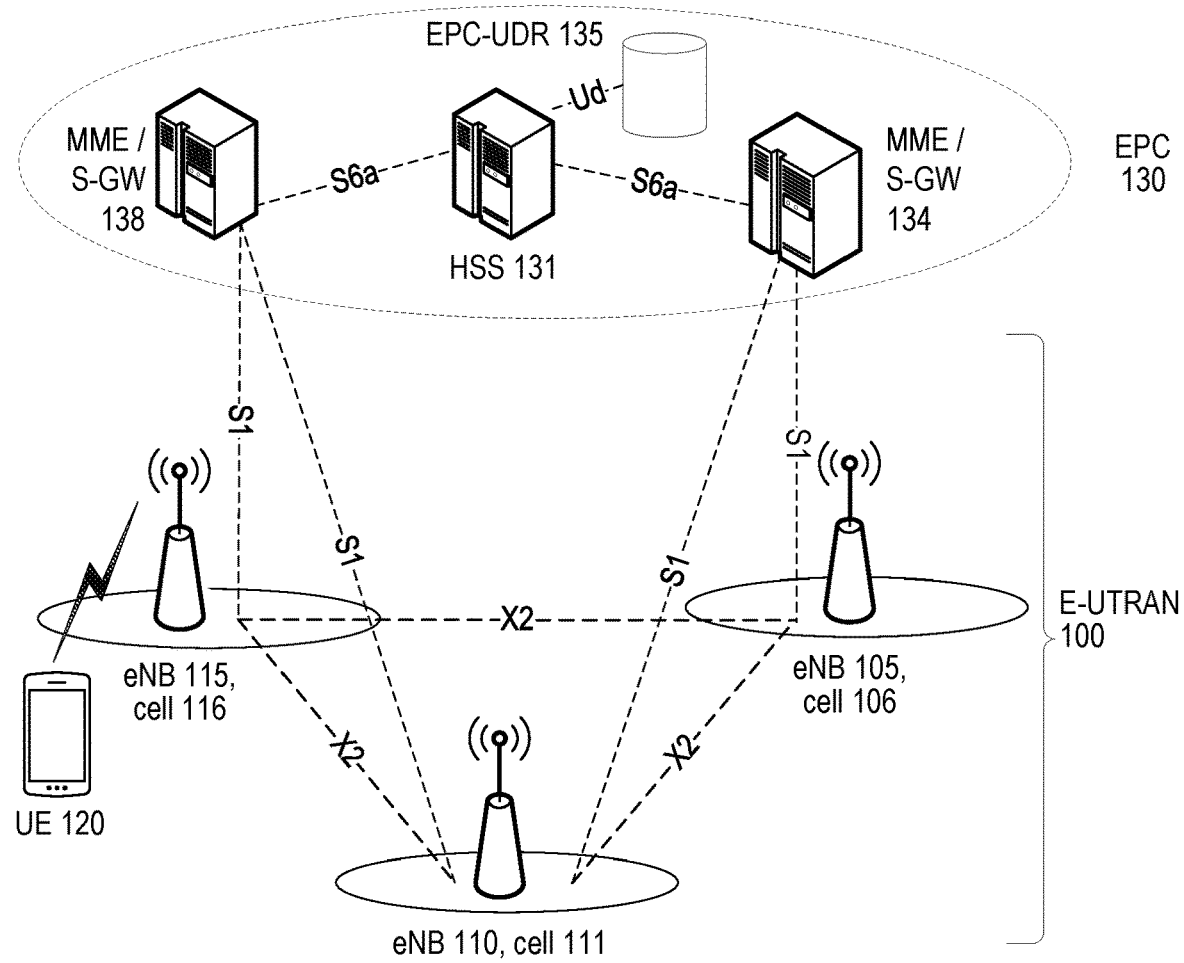
FIG. 1 shows a high-level view of an exemplary LTE network architecture.
Figure 2:
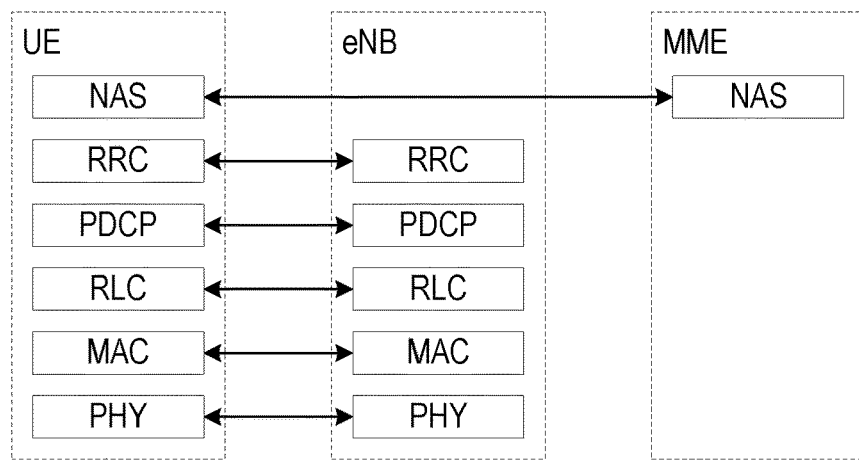
FIG. 2 shows exemplary LTE control plane (CP) protocol layers.

Embodiments summarized above will now be described in detail with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The operations of any methods disclosed herein do not have to be performed in the exact order disclosed, unless an operation is explicitly described as following or preceding another step and/or a particular order is necessarily implied by the description. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, when a UE's SCG is deactivated (or, more generally, in a reduced-energy mode such as suspended, dormant, etc.), one possible way to reduce UE energy consumption is refrain from monitoring PDCCH on the deactivated SCG. However, this can cause various problems, issues, and/or difficulties, particularly in relation to delays for subsequent activation of the SCG. This is discussed in more detail below, after the following description of NR network architectures and protocols.

Figure 3:
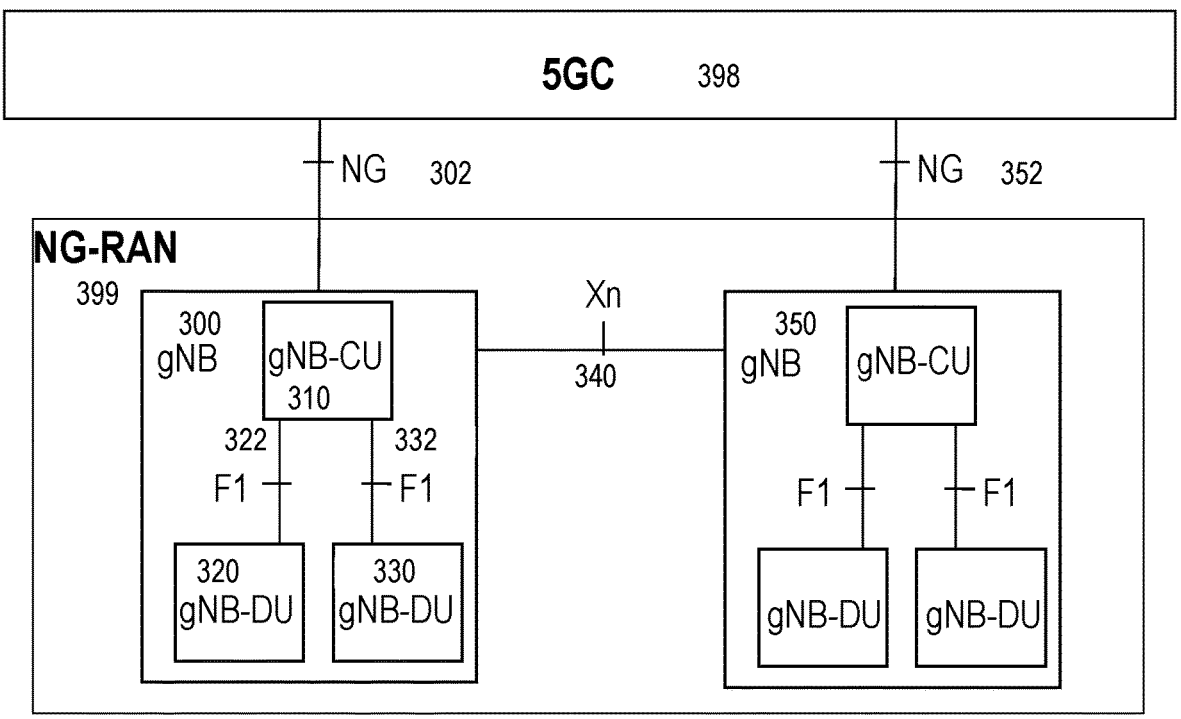
FIG. 3 shows a high-level view of an exemplary 5G/NR network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 3GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," with the term "AMF" being described below in more detail.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

Figure 4:
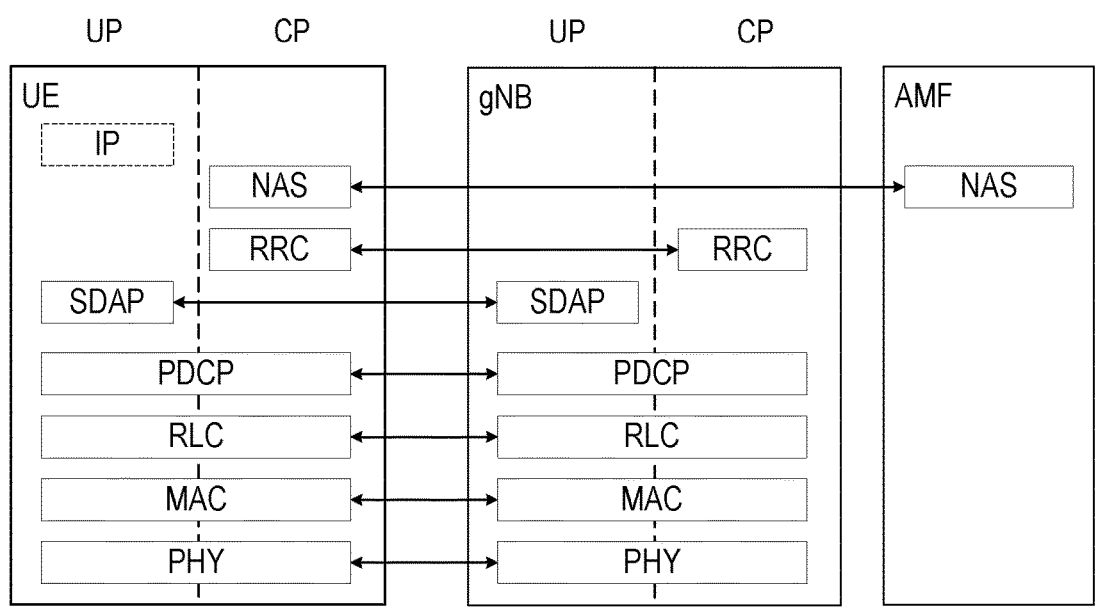
FIG. 4 shows exemplary NR user plane (UP) and CP protocol layers.

FIG. 4 shows an exemplary configuration of NR user plane (UP) and CP protocol stacks between a UE, a gNB, and an access and mobility management function (AMF) in the 5GC. The Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. When each IP packet arrives, PDCP starts a discard timer. When this timer expires, PDCP discards the associated SDU and the corresponding PDU. If the PDU was delivered to RLC, PDCP also indicates the discard to RLC. The RLC layer transfers PDCP PDUs to the MAC through logical channels (LCH). RLC provides error detection/correction, concatenation, segmentation/reassembly, sequence numbering, reordering of data transferred to/from the upper layers. If RLC receives a discard indication from associated with a PDCP PDU, it will discard the corresponding RLC SDU (or any segment thereof) if it has not been sent to lower layers.

The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On UP side, the Service Data Adaptation Protocol (SDAP)layer handles quality-of-service (QoS). This includes mapping between QoS flows and Data Radio Bearers (DRBs) and marking QoS flow identifiers (QFI) in UL and DL packets. On CP side, the non-access stratum (NAS) layer is between UE and AMF and handles UE/gNB authentication, mobility management, and security control.

The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) and used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the UE is camping. However, NR RRC includes an RRC_INACTIVE state in which a UE is known (e.g., via UE context) by the serving gNB. RRC_INACTIVE has some properties similar to a "suspended" condition used in LTE.

As briefly mentioned above, dual connectivity (DC) was first introduced in LTE Rel-12. In DC, the UE is configured with a Master Cell Group (MCG) associated with the MN and a Secondary Cell Group (SCG) associated with the SN. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell.

An SpCell is always activated and supports physical uplink control channel (PUCCH) transmission and contention-based random access by UEs.

The MN provides system information (SI) and terminates the control plane connection towards the UE and, as such, is the controlling node of the UE, including handovers to and from SNs. In LTE DC, for example, the MN terminates the connection between the eNB and the Mobility Management Entity (MME) for the UE. An SN provides additional radio resources (e.g., bearers) for radio resource bearers include MCG bearers, SCG bearers, and split bearers that have resources from both MCG and SCG. The reconfiguration, addition, and removal of SCells can be performed by RRC. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both of the MCG and the SCG can include multiple cells working in CA.

DC is also envisioned as an important feature for 5G/NR networks. 3GPP TR 38.804 (v14.0.0) describes various exemplary dual-connectivity (DC) scenarios or configurations in which the MN and SN can apply either NR RAT, LTE RAT, or both, and can connect to either EPC or 5GC. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR, and both are connected to EPC.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR and connect to 5GC via NG.

MR-DC (multi-RAT DC): a generalization of the Intra-E-UTRA Dual Connectivity (DC) described in 3GPP TS 36.300 (v16.0.0), where a multiple RxfTx UE may be configured to utilize resources provided by two different nodes connected via non-ideal backhaul, one providing E-UTRA access and the other one providing NR access. One node acts as the MN and the other as the SN, with one using LTE and the other using NR. The MN and SN are connected via a network interface and at least the MN is connected to the core network. EN-DC, NE-DC, and NGEN-DC are different example cases of MR-DC.

In both LTE and NR, a UE is configured with a MAC entity corresponding to its MCG, and the UE's MN has a corresponding MAC entity. These MAC entities can communicate by exchanging MAC Protocol Data Units (PDUs), which are byte-aligned bit strings (i.e., 8n bits in length, including any necessary padding). A maximum of one MAC PDU can be transmitted per transport block (TB) per MAC entity.

Figure 5:
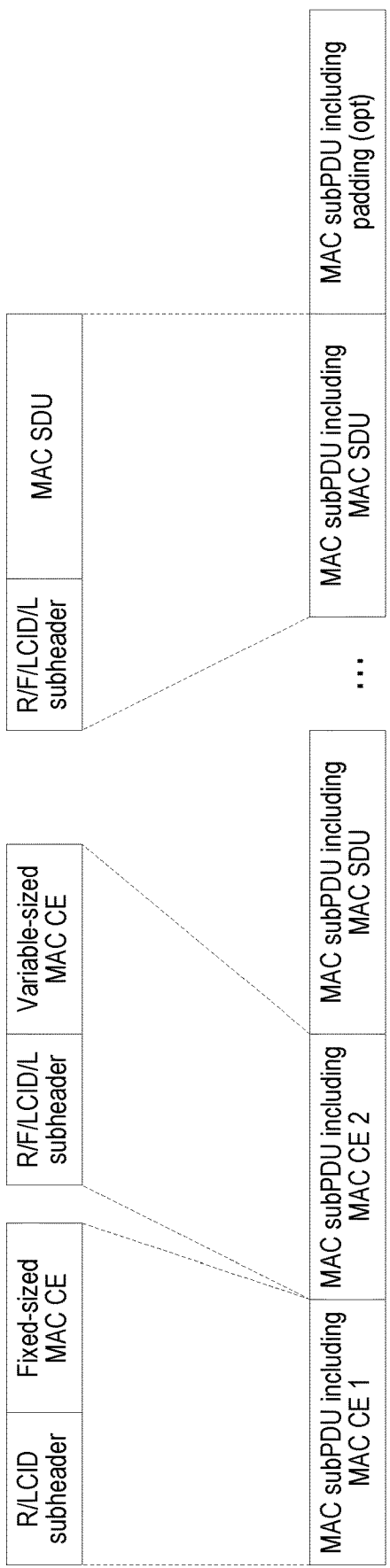
FIG. 5 shows an exemplary downlink (DL) medium access control (MAC) protocol data unit (PDU).

FIG. 5 shows an exemplary DL MAC PDU. A MAC Service Data Unit (SDU) is also a byte-aligned bit string and is included into a MAC PDU from the first bit onward. A MAC Control Elements (CEs) and subheaders are also byte-aligned bit strings. Each MAC subheader is placed immediately in front of the corresponding MAC SDU, MAC CE, or padding.

A MAC PDU consists of one or more MAC sub-PDUs. Each MAC sub-PDU can include a MAC CE and a corresponding MAC subheader. Each MAC subheader (except for fixed sized MAC CE, padding, and a MAC SDU containing UL CCCH) consists of fields R/F/LCID/(eLCID)/L. A MAC subheader for fixed sized MAC CE, padding, and a MAC SDU containing UL CCCH consists of the header fields R/LCID. As illustrated in FIG. 5, MAC sub-PDU(s) containing MAC CE(s) are placed before any MAC sub-PDU containing MAC SDU and MAC sub-PDU with padding.

The Logical Channel ID (LCID) field identifies the logical channel instance of the corresponding MAC SDU or the type of the corresponding MAC CE as described in the tables above for the Downlink Shared Channel (DL-SCH). There is one LCID field per MAC subheader. The LCID field size is 6 bits. If the LCID field is set to 34, one additional octet is present in the MAC subheader containing the eLCID field and follow the octet containing LCID field. If the LCID field is set to 33, two additional octets are present in the MAC subheader containing the eLCID field and these two additional octets follow the octet containing LCID field;

The extended Logical Channel ID (LCID) field identifies the logical channel instance of the corresponding MAC SDU or the type of the corresponding MAC CE as described in tables 6.2.1-3a, 6.2.1-b 6.2.1-2a and 6.2.1-2b for the DL-SCH and UL-SCH respectively. The size of the eLCID field is either 8 bits or 16 bits.

The Length (L) field indicates the length of the corresponding MAC SDU or variable-sized MAC CE in bytes. There is one L field per MAC subheader except for subheaders corresponding to fixed-sized MAC CEs, padding, and MAC SDUs containing UL CCCH.

Figure 6:
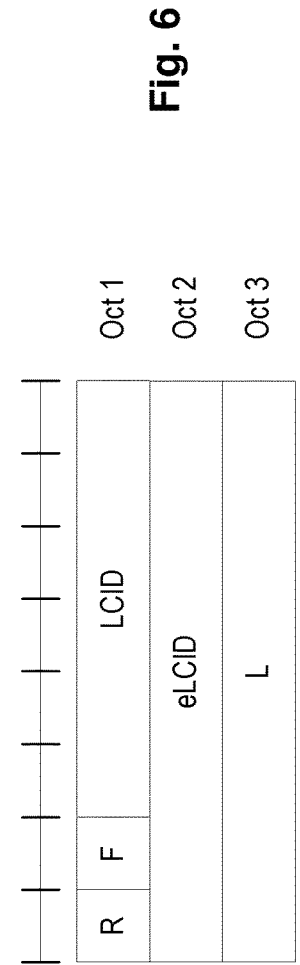
FIG. 6 shows an exemplary subheader for a variable-sized MAC control element (CE).

The size of the L field is indicated by the Format (F) field. There is one F field per MAC subheader except for subheaders corresponding to fixed-sized MAC CEs, padding, and MAC SDUs containing UL CCCH. The size of the F field is 1 bit, with 0 indicating Length of 8 bits and 1 indicating Length of 16 bits. FIG. 6 shows an exemplary MAC subheader for a variable sized MAC CE with 8-bit L field. Finally, the Reserved (R) bit is set to 0.

MAC CEs facilitate dynamic activation/deactivation of various functionalities without the need to rely on RRC signalling, which is slower to process by the UE and could require the processing at network entities further from the UE, thereby increasing latency. The different MAC CEs received by the MAC entity at the UE are distinguished by different LCIDs, such as LCIDs 0-63 listed in Table 1 below.

TABLE 1

| Codepoint/Index | LCID values |
|---|---|
| 0 | CCCH |
| 1-32 | Identity of the logical channel |
| 33 | Extended logical channel ID field (two-octet eLCID field) |
| 34 | Extended logical channel ID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |

TABLE 1-continued

| Codepoint/Index | LCID values |
|---|---|
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

Table 2 below lists various one-octet eLCIDs. Two-octect (16-bit) eLCIDs can also be used.

TABLE 2

| Codepoint | Index | eLCID values |
|---|---|---|
| 0 to 244 | 64 to 308 | Reserved |
| 245 | 309 | Serving Cell Set based SRS Spatial Relation Indication |
| 246 | 310 | PUSCH Pathloss Reference RS Update |
| 247 | 311 | SRS Pathloss Reference RS Update |
| 248 | 312 | Enhanced SP/AP SRS Spatial Relation Indication |
| 249 | 313 | Enhanced PUCCH Spatial Relation Activation/Deactivation |
| 250 | 314 | Enhanced TCI States Activation/Deactivation for UE-specific PDSCH |
| 251 | 315 | Duplication RLC Activation/Deactivation |
| 252 | 316 | Absolute Timing Advance Command |
| 253 | 317 | SP Positioning SRS Activation/Deactivation |
| 254 | 318 | Provided Guard Symbols |
| 255 | 319 | Timing Delta |

Figure 7A:
FIGS. 7A-P show contents of various exemplary NR MAC CEs.
Figure 7B:
Figure 7C:
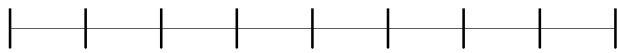
Figure 7D:
Figure 7E:
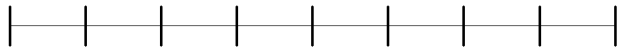
Figure 7I:
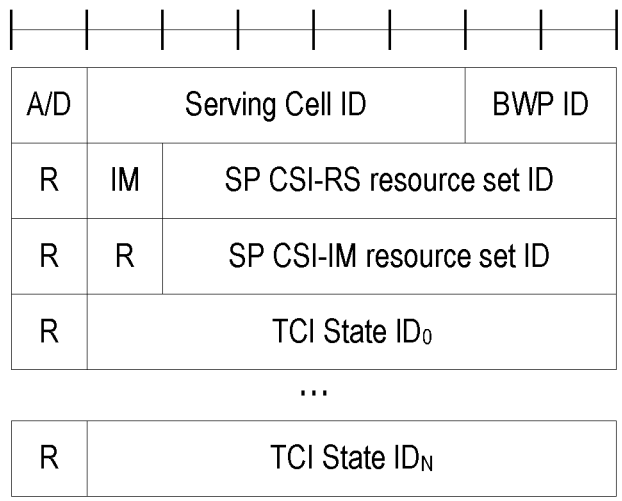
Figure 7J:
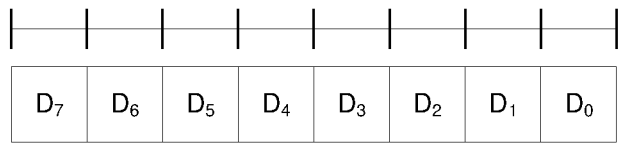
Figure 7K:
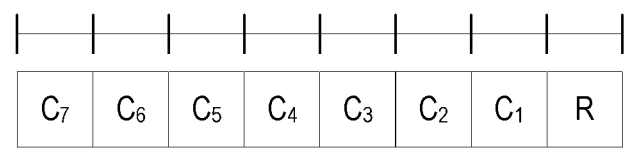
Figure 7L:
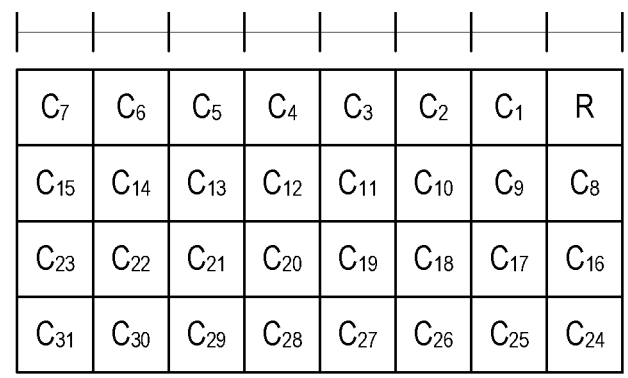
Figure 7M:
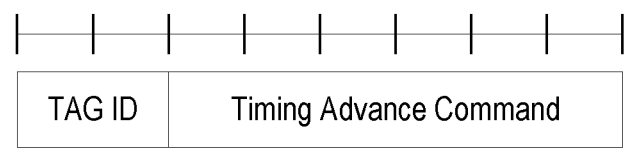
Figure 7N:
Figure 7O:
Figure 7P:
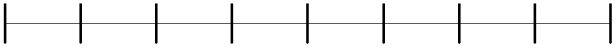

FIG. 7, which includes FIGS. 7A-P, shows contents of various exemplary NR MAC CEs. These include the following DL MAC CEs:

FIG. 7A: Recommended bit rate MAC CE, which is used to provide the MAC entity with information about the bit rate which the gNB recommends.

FIG. 7B: SP ZP CSI-RS Resource Set Activation/Deactivation MAC CE, which is used to activate and deactivate the configured Semi-persistent ZP CSI-RS resource set of a Serving Cell.

FIG. 7C: PUCCH spatial relation Activation/Deactivation MAC CE, which is used to activate and deactivate a spatial relation for a PUCCH resource of a Serving Cell. The network may also activate and deactivate a spatial relation for a PUCCH resource or a PUCCH resource group of a Serving Cell by sending the Enhanced PUCCH spatial relation Activation/Deactivation MAC CE.

FIG. 7D: SP CSI reporting on PUCCH Activation/Deactivation MAC CE, which is used for Activation/Deactivation of Semi-persistent CSI reporting on PUCCH.

FIG. 7E: TCI State Indication for UE-specific PDCCH MAC CE, which is used to indicate a TCI state for PDCCH reception for a CORESET of a Serving Cell or a set of Serving Cells configured in simultaneous TCI-UpdateList1-r16 or simultaneousTCI-UpdateList2-r16.

FIG. 7F: SP SRS Activation/Deactivation MAC CE, which is used to activate and deactivate the configured Semi-persistent SRS resource sets of a Serving Cell by reception at the UE's MAC entity.

FIG. 7G: TCI States Activation/Deactivation for UE-specific physical downlink shared channel (PDSCH)

MAC CE, which is used to activate and deactivate the configured TCI states for PDSCH of a Serving Cell or a set of Serving Cells configured in simultaneousTCI-UpdateList1-r16 or simultaneousTCI-UpdateList2-r16.

FIG. 7H: Aperiodic CSI Trigger State Subselection MAC CE, which is used to select among the configured aperiodic CSI trigger states of a Serving Cell.

FIG. 7I: SP CSI-RS/CSI-IM Resource Set Activation/Deactivation MAC CE, which is used to activate and deactivate the configured Semi-persistent CSI-RS/CSI-IM resource sets of a Serving Cell.

FIG. 7J: Duplication Activation/Deactivation MAC CE. If one or more DRBs are configured with PDCP duplication, the network may activate and deactivate the PDCP duplication for all or a subset of associated RLC entities for the configured DRB(s).

FIGS. 7K-L: SCell Activation/Deactivation MAC CEs (one and four octets, respectively), which are used if the MAC entity is configured with one or more SCells, and the network wants to activate and deactivate the configured SCells.

FIG. 7M: Timing Advance Command. RRC configures parameters for the maintenance of UL time alignment, such as the timeAlignmentTimer (per TAG) which controls how long the MAC entity considers the Serving Cells belonging to the associated TAG to be uplink time aligned. This MAC CE is used so that when a Timing Advance Command MAC CE is received, and if an NTA has been maintained with the indicated TAG, the UE applies the Timing Advance Command for the indicated TAG; and start or restart the timeAlignmentTimer associated with the indicated TAG.

FIG. 7N: UE Contention Resolution Identity, which is used for contention resolution during UE random access to piggyback the identifier transmitted in Msg3.

FIGS. 7O-P show exemplary MAC CEs transmitted by the UE MAC entity on the UL Shared Channel (UL-SCH). In particular, FIGS. 7O-P show variants of a Beam Failure Report (BFR) MAC CE, which is used by the UE for indicating to the serving gNB of a new SSB or CSI-RS when beam failure is detected on the serving SSB(s)/CSI-RS(s). Beam failure is detected by counting beam failure instance indication from the lower layers to the MAC entity. FIG. 7O shows a variant in which the highest ServCellIndex of this MAC entity's SCell configured with BFD is less than 8, while FIG. 7P shows a variant in which the highest ServCellIndex of this MAC entity's SCell configured with BFD is equal to or higher than 8.

Figure 8:
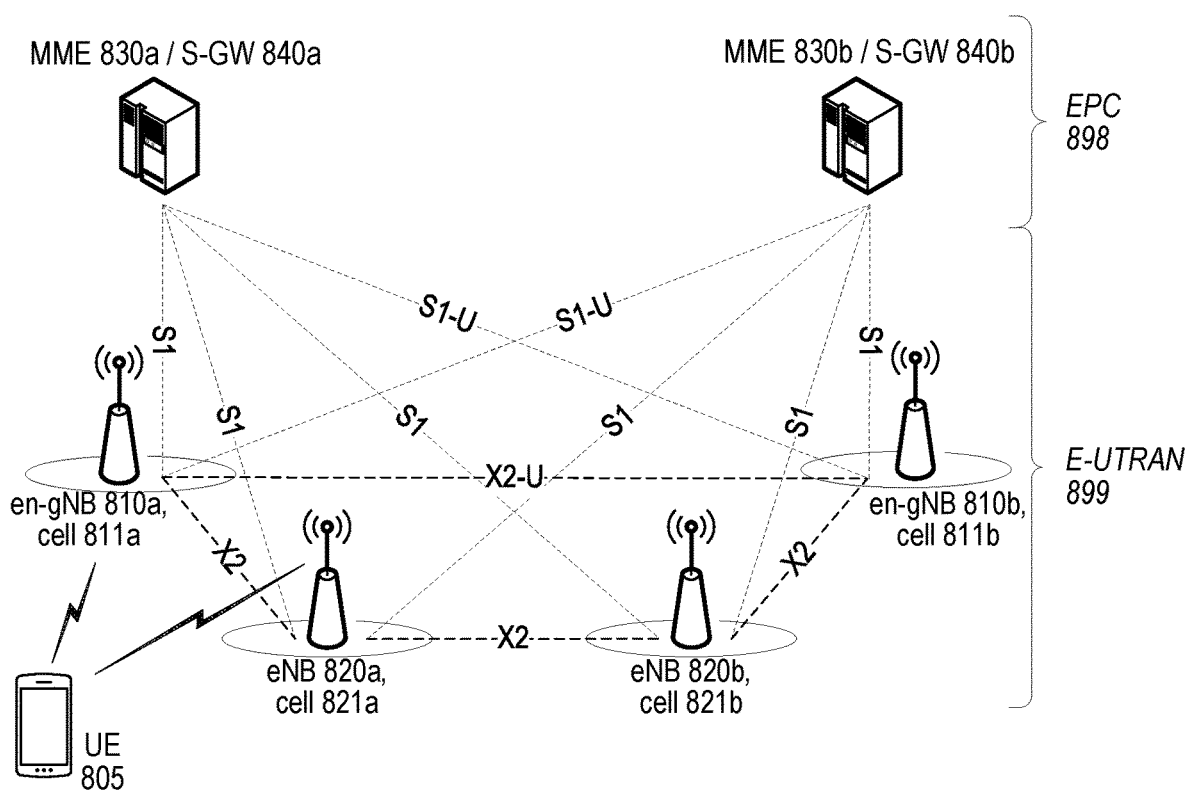
FIGS. 8-9 show high-level views of exemplary network architectures that support multi-RAT DC (MR-DC) using EPC and 5GC, respectively.

FIG. 8 shows a high-level view of an exemplary network architecture that supports EN-DC, including an E-UTRAN 899 and an EPC 898. As shown in the figure, E-UTRAN 899 can include en-gNBs 810 (e.g., 810a,b) and eNBs 820 (e.g., 820a,b) that are interconnected with each other via respective X2 (or X2-U) interfaces. The eNBs 820 can be similar to those shown in FIG. 1, while the ng-eNBs can be similar to the gNBs shown in FIG. 3 except that they connect to EPC 898 via an S1-U interface rather than to a 5GC via an X2 interface. The eNBs also connect to EPC 898 via an S1 interface, similar to the arrangement shown in FIG. 1. More specifically, en-gNBs 810 (e.g., 810a,b) and eNBs 820 (e.g., 820a,b) connect to MMEs (e.g., MMEs 830a,b) and S-GWs (e.g., S-GWs 840a,b) in EPC 898.

Each of the en-gNBs and eNBs can serve a geographic coverage area including one more cells, including cells 811a-b and 821a-b shown as exemplary in FIG. 8. Depending on the particular cell in which it is located, a UE 805 can communicate with the en-gNB or eNB serving that particular cell via the NR or LTE radio interface, respectively. In addition, UE 805 can be in EN-DC connectivity with a first cell served by an eNB and a second cell served by an en-gNB, such as cells 820a and 810a shown in FIG. 8.

Figure 9:
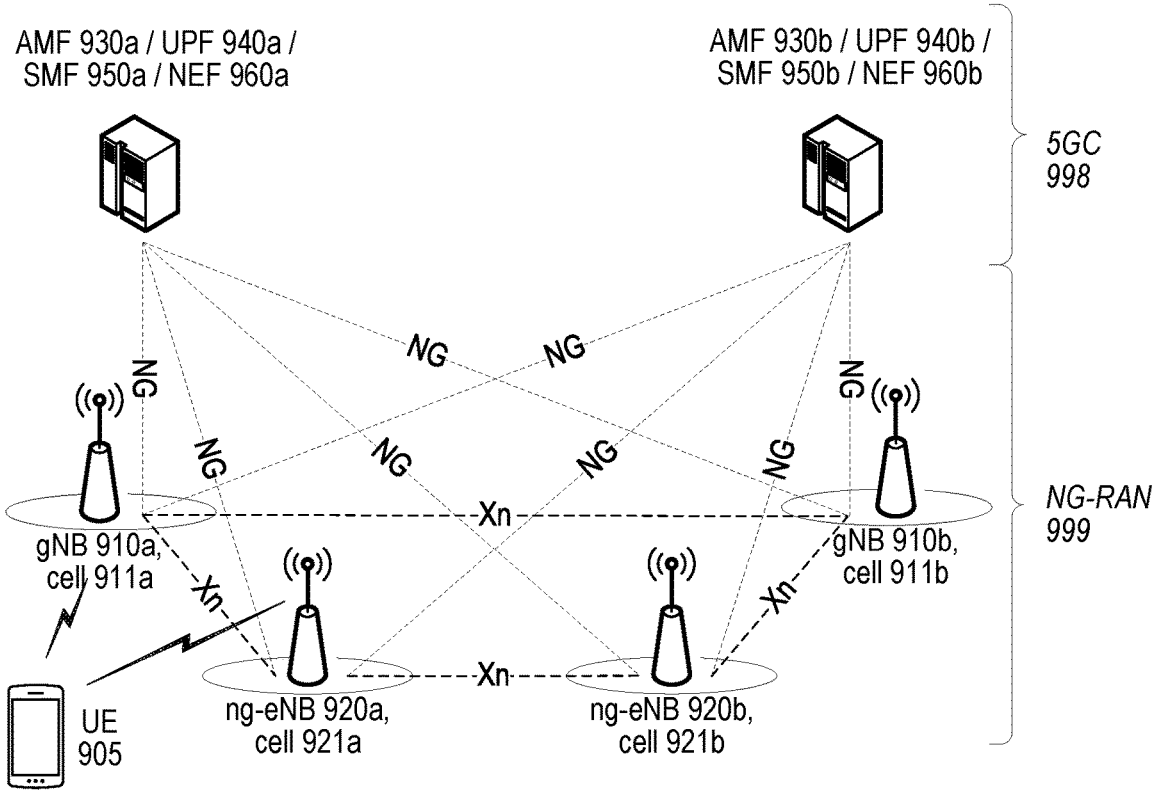

FIG. 9 shows a high-level view of an exemplary network architecture that supports MR-DC configurations based on a 5GC. More specifically, FIG. 9 shows an NG-RAN 999 and a 5GC 998. NG-RAN 999 can include gNBs 910 (e.g., 910a,b) and ng-eNBs 920 (e.g., 920a,b) that are interconnected with each other via respective Xn interfaces. The gNBs and ng-eNBs are also connected via the NG interfaces to 5GC 998, more specifically to the AMF (Access and Mobility Management Function) 930 (e.g., AMFs 930a,b) via respective NG-C interfaces and to the UPF (User Plane Function) 940 (e.g., UPFs 940a,b) via respective NG-U interfaces. Moreover, the AMFs 930a,b can communicate with one or more session management functions (SMFs, e.g., SMFs 950a,b) and network exposure functions (NEFs, e.g., NEFs 960a,b).

Each of the gNBs 910 can be similar to those shown in FIG. 3, while each of the ng-eNBs can be similar to the eNBs shown in FIG. 1 except that they connect to 5GC 998 via an NG interface rather than to EPC via an S1 interface. Each of the gNBs and ng-eNBs can serve a geographic coverage area including one more cells, including cells 911a-b and 921a-b shown as exemplary in FIG. 9. The gNBs and ng-eNBs can also use various directional beams to provide coverage in the respective cells. Depending on the particular cell in which it is located, a UE 905 can communicate with the gNB or ng-eNB serving that particular cell via the NR or LTE radio interface, respectively. In addition, UE 905 can be in MR-DC connectivity with a first cell served by an ng-eNB and a second cell served by a gNB, such as cells 920a and 910a shown in FIG. 9.

Figure 10:
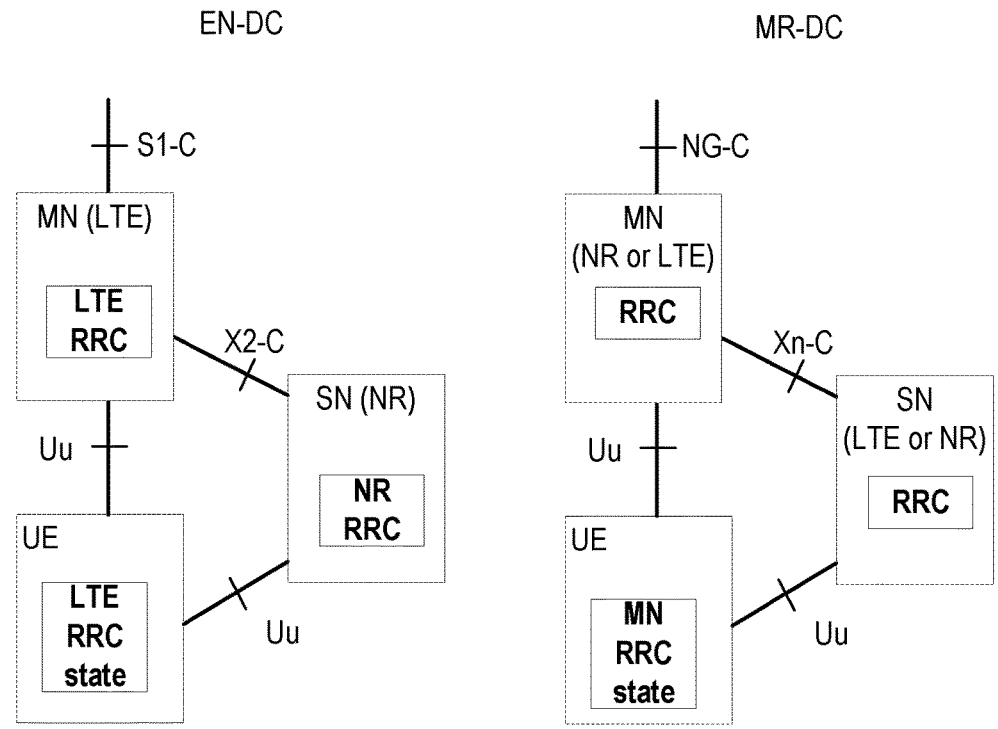
FIG. 10 shows a high-level comparison of CP architectures for MR-DC using EPC and 5GC, respectively.

FIG. 10 is a block diagram showing a high-level comparison of control plane (CP) architectures in EN-DC with EPC (e.g., FIG. 8) and MR-DC with 5GC (e.g., FIG. 9). The particular RATs used by MN and SN in these two architectures are shown in parentheses and discussed in more detail above. In either case, the UE has a single RRC state based on the MN RRC (LTE or NR) and a single CP connection towards the CN via Uu interface to MN and S1-C or NG-C interface to CN, as the case may be. RRC PDUs generated by the SN can be transported via the X2-C or Xn-C interface to the MN (as the case may be) and the Uu interface from MN to UE. The MN always sends the initial SN RRC configuration via MCG SRB (SRB1), but subsequent reconfigurations may be transported via MN or SN. When transporting RRC PDU from the SN, the MN does not modify the UE configuration provided by the SN.

As shown in FIG. 10, each of MN and SN has an RRC entity for creating RRC Information Elements (IE) and messages for configuring the UE. Since the SN is responsible for its own resources, it provides the UE with the SCG configuration in an RRC message and also the radio bearer configuration in an IE, for all bearers that are terminated in the SN. The MN in turn creates the MCG configuration and the radio bearer configuration for all bearers terminated in the MN. The cell group configuration includes the configuration of Li (physical layer), MAC and RLC. The radio bearer configuration includes the configuration of PDCP (and SDAP in case of 5GC).

The SN Addition procedure is initiated by the MN and is used to establish a UE context at the SN in order to provide resources from the SN to the UE. For bearers requiring SCG radio resources, this procedure is used to add at least the initial SCG serving cell of the SCG. This procedure can also be used to configure an SN-terminated MCG bearer (where no SCG configuration is needed). Further details of the SN addition procedure are provided in 3GPP TS 37.340, 38.423 (for XnAP messages/procedures), and 38.331 (for RRC messages exchanged between the UE and the network).

As mentioned above, 3GPP Rel-17 includes a work item for efficient SCG/SCell activation/deactivation for UEs in MR-DC. This can be especially important for MR-DC configurations with NR SCG since it has been found that, in some cases, NR UE energy consumption is three-to-four times higher than in LTE. 3GPP previously specified the concepts of dormant LTE SCell and dormancy-like behavior of an NR SCell. In LTE, when an SCell is in dormant state, the UE does not need to monitor the corresponding PDCCH or PDSCH and cannot transmit in the corresponding UL. This behavior is similar to behavior in a deactivated state, but the UE is also required to perform and report CQI measurements, which is different from deactivated state behavior. A PUCCH SCell (SCell configured with PUCCH) cannot be in dormant state.

In NR, dormancy-like behavior for SCells is based on the concept of dormant bandwidth parts (BWP). One of the UE's dedicated BWPs configured via RRC signaling can be configured as dormant for an SCell. If the active BWP of the activated SCell is a dormant BWP, the UE stops monitoring PDCCH on the SCell but continues performing CSI measurements, AGC, and beam management (if configured to do so). Downlink control information (DCI) on PDCCH is used to control entering/leaving the dormant BWP for SCell(s) or SCG(s), and is sent to the SpCell of the cell group that includes the dormant SCell (i.e., to PCell if SCell belongs to MCG, to PSCell if SCell belongs to SCG). The SpCell (i.e., PCell or PSCell) and PUCCH SCell cannot be configured with a dormant BWP.

Figure 11:
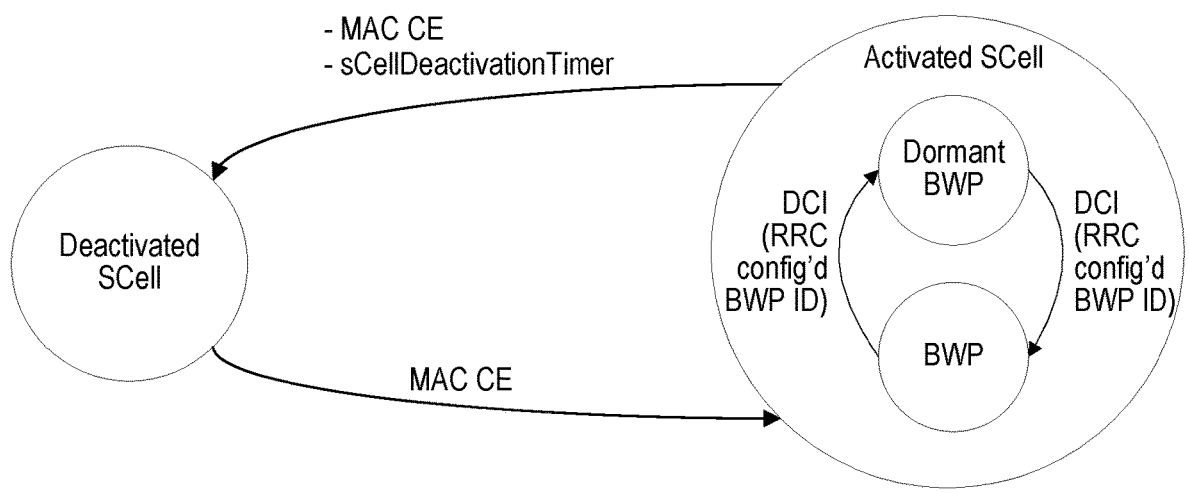
FIG. 11 is an exemplary state transition diagram for NR secondary cells (SCells).

FIG. 11 is an exemplary state transition diagram for NR SCells. At a high level, a UE's SCell can transition between deactivated and activated states based on explicit commands from the network (e.g., MAC CEs) or expiration of a deactivation timer. Within the activated state, a particular BWP can transition between active and dormant conditions based on DCI received from the network.

However, if the UE is configured with MR-DC, it cannot fully benefit from the energy reductions of dormant state or dormancy-like behavior since the PSCell cannot be configured to be dormant. Instead, an alternate solution could be releasing (for power savings) and adding (when traffic demands requires) the SCG on an as-needed basis. Traffic is likely to be bursty, however, so adding and releasing the SCG as needed can involve a significant amount of RRC signaling and inter-node messaging between the MN and the SN. This can experience considerable delay.

In the context of 3GPP Rel-16, there were some discussions about placing the PSCell in dormancy, also referred to as SCG Suspension. Some agreed principles of this solution include:
 The UE supports network-controlled suspension of the SCG in RRC_CONNECTED.
 UE behavior for a suspended SCG is for further study (FFS)
 The UE supports at most one SCG configuration, suspended or not suspended, in Rel16.
 In RRC_CONNECTED upon addition of the SCG, the SCG can be either suspended or not suspended by configuration.

More detailed solutions were proposed for Rel-16, but these have various problems. For example, one solution proposed that a gNB can indicate for a UE to suspend SCG transmissions when no data traffic is expected to be sent in SCG, so that UE keeps the SCG configuration but does not use it for power saving purposes. Signaling to suspend SCG could be based on DCI/MAC-CE/RRC, but no details were discussed above the particular configuration from the gNB to the UE. Even so, this solution for SCells may not be applicable to PSCells, which may be associated with a different network node (e.g., a gNB operating as SN).

No specific SCG energy reduction techniques have been discussed for 3GPP Rel-17. However, it is expected that such techniques will involve one or more of the following:
 The UE starting to operate the PSCell in dormancy, e.g., switching the PSCell to a dormant BWP). The network considers the PSCell in dormancy and at least stops transmitting PDCCH for that UE in the PSCell.
 The UE deactivating the PSCell, similar to SCell deactivation. The network considers the PSCell as deactivated and at least stops transmitting PDCCH for that UE in the PSCell.
 The UE operating the PSCell in long DRX; SCG DRX can be switched off from the MN (e.g., via MCG MAC CE or DCI) when the need arises, such as DL data arrival for SN-terminated SCG bearers.
 The UE suspending its operation with the SCG (e.g., suspending bearers associated with SCG, including MN- and SN-terminated bearers) but storing the SCG configuration ("stored SCG). On the network side, the SN can store the SCG like the UE, or the SN can release the UE's SCG context and re-generate it upon resume. The latter option requires support from the MN, which stores SCG context for UEs whose SCG is suspended.

Although these techniques are focused on SCG, it is likely that similar approaches could be used on the MCG. For example, the MCG may be suspended or in long DRX, while data communication is happening only via the SCG.

Figure 12:
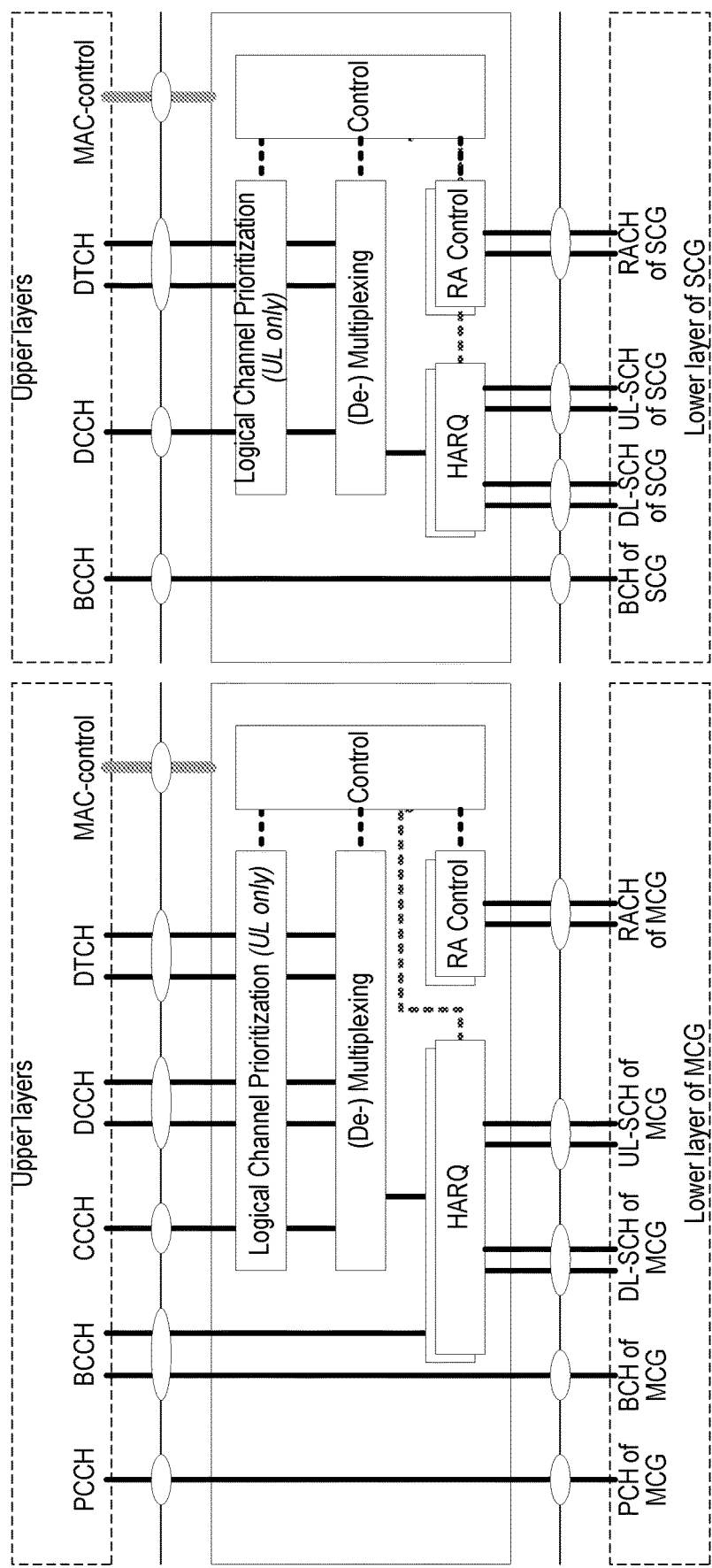
FIG. 12 shows an exemplary UE MAC structure when configured with two MAC entities.

A UE in DC is configured with two MAC entities: one for the MCG in the MN and one for the SCG in the SN. FIG. 12 shows an exemplary UE MAC structure when configured with two MAC entities. Each MAC entity includes a HARQ entity, random access (RA) control, multiplexing/demultiplexing, LCH prioritization, and control functionality.

3GPP TS 38.321 (v16.1.0) specifies that the functions of the two UE MAC entities shown in FIG. 12 operate independently unless otherwise specified. For example, the timers and parameters used in each MAC entity are configured independently unless otherwise specified. Each MAC entity considers only the serving cells, C-RNTI, radio bearers, LCHs, upper layer entities, lower layer entities, LCGs, and HARQ entities associated with that MAC entity (i.e., not those associated with another MAC entity), unless otherwise specified. If a MAC entity is configured with one or more SCells, there are multiple DL-SCH and there may be multiple UL-SCH as well as multiple RACH per MAC entity (e.g., one DL-SCH, one UL-SCH, and one RACH on the SpCell, plus one DL-SCH, zero or one UL-SCH, and zero or one RACH for each SCell). If a MAC entity is not configured with any SCell, there is one DL-SCH, one UL-SCH, and one RACH for that MAC entity.

One of the main energy-saving features of the options described above is that the UE does not monitor PDCCH on a deactivated SCG (e.g., in the PSCell). At the same time, the UE should be ready to resume SCG operation (i.e., transition to a normal mode of operation) without excessive delay. Otherwise, it would have been easier to release and later add the SCG rather than deactivating it. Additionally, some mechanisms to improve readiness rely on SCG MAC CEs, such as a MAC CE to resume the operation, a MAC CE to update TCI state, a MAC CE to activate temporary reference signals, etc.

At the same time, it may be beneficial for the UE to continue performing channel state information (CSI) and/or radio resource management (RRM) measurements to improve the readiness and speed up the resumption/activation of the SCG, when suitable. For example, to improve readiness for receiving PDCCH on the SCG shortly after having received a command to resume/activate the SCG, the UE needs to report CSI and receive MAC CEs, which is not possible because the UE does not monitor PDCCH on the SCG. To summarize, there is a tradeoff between UE energy consumption and readiness to resume SCG operation, which current techniques do not adequately address.

Accordingly, embodiments of the present disclosure provide techniques whereby a UE can receive/transmit a MAC message from/to a deactivated SCG via the UE's MCG. More generally, such techniques facilitate a UE to receive/transmit a MAC message (e.g., MAC PDU, MAC SDU, MAC sub-PDU, MAC CE) associated with a first MAC entity via a second MAC entity. These techniques address the scenario in which the SCG is deactivated and the UE is not monitoring PDCCH on the SCG (e.g., PSCell and any SCG SCells) but the network needs to update information related to operation of the UE's SCG MAC entity. For example, the network may need to update TCI state indication for PDCCH when the UE is moving and beam correspondence changes, and/or the network needs to activate some particular CSI-RS resources. As another example, the UE can use the disclosed techniques to send the network a beam failure report (BFR) related to the deactivated SCG via the MCG.

Even so, the disclosed techniques are not limited to a deactivated SCG. Similar principles can be applied to an MCG that is deactivated, so that the UE stops monitoring PDCCH on the MCG and continues monitoring PDCCH on the SCG. Embodiments are also applicable as a diversity mechanism where MAC SDUs (e.g., MAC CEs) associated with one cell group can also be transmitted (e.g., as a duplicate) via another cell group to increase robustness. This could apply when one of the cell groups has in a less reliable link, such as for frequencies in Frequency Range 2 (FR2, e.g., above 52 GHz) or even in Tera Hertz ranges. For example, each MAC CE could be designed to have/include a version in the other cell group.

Likewise, the disclosed techniques are not limited to a two cell groups. Embodiments are applicable to the case where the UE is configured with more than two cell groups, such that a MAC CE of one of the cell groups can be transmitted/received via one or more of the other cell groups. Similarly, the disclosed techniques are not limited to MAC CEs but are applicable to any messages (e.g., MAC SDUs) from a lower layer of one cell group that can be transmitted/received via another cell group.

Embodiments can provide various benefits, advantages, and/or solutions to problems described herein. For example, when the UE transmits/receives a MAC message for a deactivated cell group (e.g., SCG) in another activated cell group (e.g., MCG), this allows the UE to refrain from monitoring PDCCH of the deactivated cell group, thereby reducing UE energy consumption. At the same time, by transmitting/received such MAC messages via the other cell group, the UE is prepared to (re-)activate or resume the deactivated cell group without excess delay.

In the following discussion, the terms "suspended SCG", "deactivated SCG", "inactive SCG", and "SCG in reduced-energy mode" are used interchangeably. From the UE perspective, however, "SCG in reduced-energy mode" means that the UE is operating in a reduced-energy mode with respect to the SCG. Likewise, the terms "resumed SCG", "activated SCG", "active SCG", "SCG in normal energy mode", "normal SCG operation", and "legacy SCG operation" are used interchangeably. From the UE perspective, "SCG in normal energy mode" means that the UE is operating in a normal (i.e., non-reduced) energy mode with respect to the SCG. Examples of operations are UE signal reception/transmission procedures e.g., RRM measurements, reception of signals, transmission of signals, measurement configuration, measurement reporting, evaluation of triggered event measurement reports, etc.

In the following discussion, the phrases "measurements on the SCG" or "measurements associated with the SCG" correspond to performing measurements on a cell of the SCG (e.g., SpCell) and/or performing measurements according to an SCG measurement configuration.

Some embodiments of the present disclosure include methods for a UE configured for MR-DC via a first cell group (e.g., MCG) and a second cell group (e.g., SCG). These methods include receiving or transmitting a MAC message (e.g., sub-PDU, CE) associated with the second cell group via the first cell group.

In some embodiments, the UE receives or transmits a first MAC CE of the first cell group (e.g., an MCG MAC CE, like a MAC CE of the PCell) while the second cell group is deactivated.

That MAC CE can be a new MAC CE that is associated with a LCID that indicates that the MAC CE of the first cell group encapsulates a second MAC CE that is associated with a different cell group, e.g., the second cell group. The MAC CE of the first cell group includes in its payload MAC CE of the second cell group, i.e., a MAC CE associated with the SCG MAC entity and with the PSCell or any of the SCG SCells. Such a newly defined MCG MAC CE can be a generic MAC CE of variable size (e.g., a MAC CE container) that may contain/encapsulate in its payload an SCG MAC CE for any DL or UL operation related to the SCG that the network or UE wants to perform and either cannot do (e.g., in case the UE is not performing PDCCH monitoring on SCG) or wants to do via the MCG.

Figure 13:
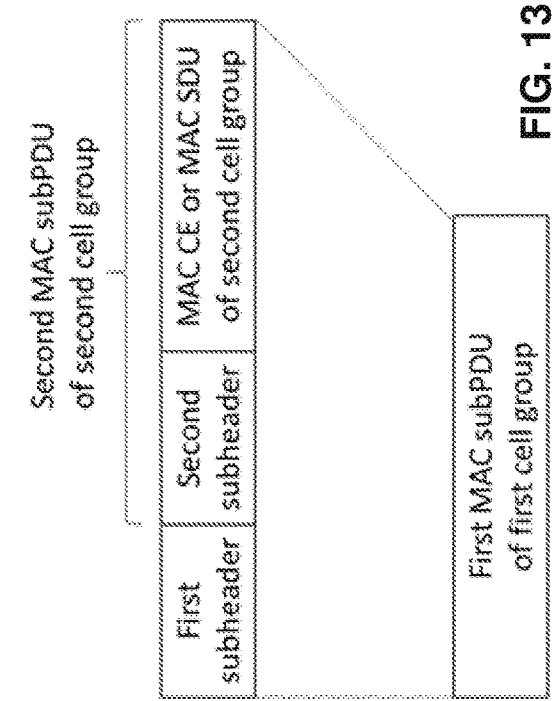
FIG. 13 shows an exemplary MAC sub-PDU, according to various embodiments of the present disclosure.

In other embodiments, the UE receives or transmits a first MAC sub-PDU of the first cell group while the second cell group is deactivated. FIG. 13 shows an exemplary (first) MAC sub-PDU according to these embodiments. The first MAC sub-PDU contains a first MAC subheader and then a second MAC sub-PDU for carrying a second MAC subheader and a second MAC CE or MAC SDU of the second cell group. The first MAC subheader can include a newly defined LCID value that indicates the first MAC sub-PDU encapsulates a second MAC subheader and a MAC CE or MAC SDU of the second cell group and/or second MAC entity.

The second MAC subheader indicates the payload of the second MAC sub-PDU, which could be either a MAC CE or MAC SDU. In case of MAC CE, the second MAC subheader also indicates the type iMac CE included. The second MAC subheader is encoded in the same manner as if it were transmitted in the SCG. The second MAC sub-PDU could also be of a different RAT than the first MAC subheader.

Table 3 below illustrates how the eLCID definitions shown in Table 2 above can be adapted and/or modified according to these embodiments. In particular, codepoint 244 (index 308) is used to indicate a container for a second MAC sub-PDU.

TABLE 3

| Codepoint | Index | LCID values |
|---|---|---|
| 0 to 243 | 64 to 307 | Reserved |
| 244 | 308 | Container for second MAC sub-PDU |
| 245 | 309 | Serving Cell Set based SRS Spatial Relation Indication |
| 246 | 310 | PUSCH Pathloss Reference RS Update |
| 247 | 311 | SRS Pathloss Reference RS Update |
| 248 | 312 | Enhanced SP/AP SRS Spatial Relation Indication |
| 249 | 313 | Enhanced PUCCH Spatial Relation Activation/Deactivation |
| 250 | 314 | Enhanced TCI States Activation/Deactivation for UE-specific PDSCH |
| 251 | 315 | Duplication RLC Activation/Deactivation |
| 252 | 316 | Absolute Timing Advance Command |
| 253 | 317 | SP Positioning SRS Activation/Deactivation |
| 254 | 318 | Provided Guard Symbols |
| 255 | 319 | Timing Delta |

Some embodiments of the present disclosure include various operations by a UE configured for MR-DC via a first cell group (e.g., MCG) and a second cell group (e.g., SCG), or by the first and second network nodes (e.g., MN and SN) that provide the respective first and second cell groups for the UE.

In some of these embodiments, the UE or network node determines that the MAC sub-PDU received via the first cell group (e.g., MCG) encapsulates an MAC sub-PDU associated with the second cell group (e.g., SCG) by inspecting the LCID in the MAC subheader, which identifies that the content of the MAC sub-PDU relates to the second cell group and/or a second MAC entity. For simplicity, and without limitation, the following will refer to an MCG MAC sub-PDU that encapsulates an SCG MAC sub-PDU.

When the receiver is a UE, upon reception the UE decapsulates the payload of the MCG MAC sub-PDU to identify the SCG MAC sub-PDU, and indicates this SCG MAC sub-PDU to the UE SCG MAC entity at the UE. The UE SCG MAC entity processes the SCG MAC subheader to determine the type of payload in the MAC sub-PDU. In case the MAC sub-PDU contains a MAC CE related to the SCG, the UE processes the MAC CE according to the specifications of the SCG MAC CE (e.g., by sending an indication to the SCG lower layers). The figure below illustrates this operation for the legacy case, where MAC entities are completely independent, and the new case disclosed herein.

Figure 14A:
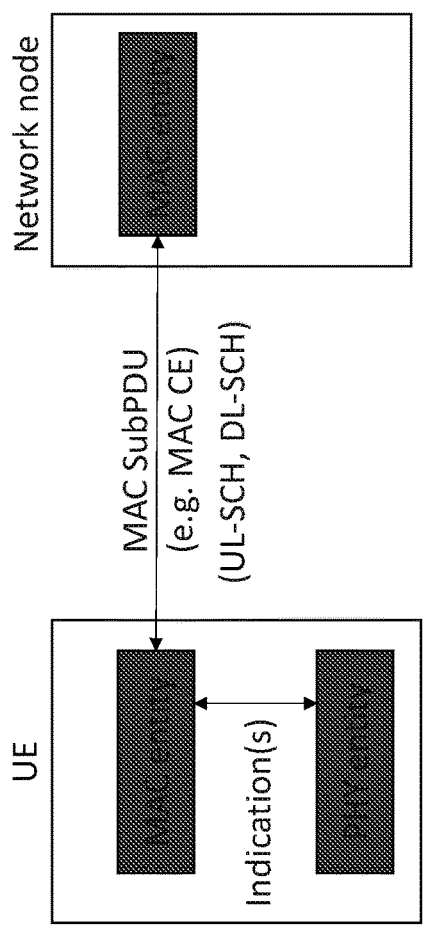
FIGS. 14A-B illustrate UE reception of MAC sub-PDUs according to conventional techniques and embodiments of the present disclosure, respectively.
Figure 14B:
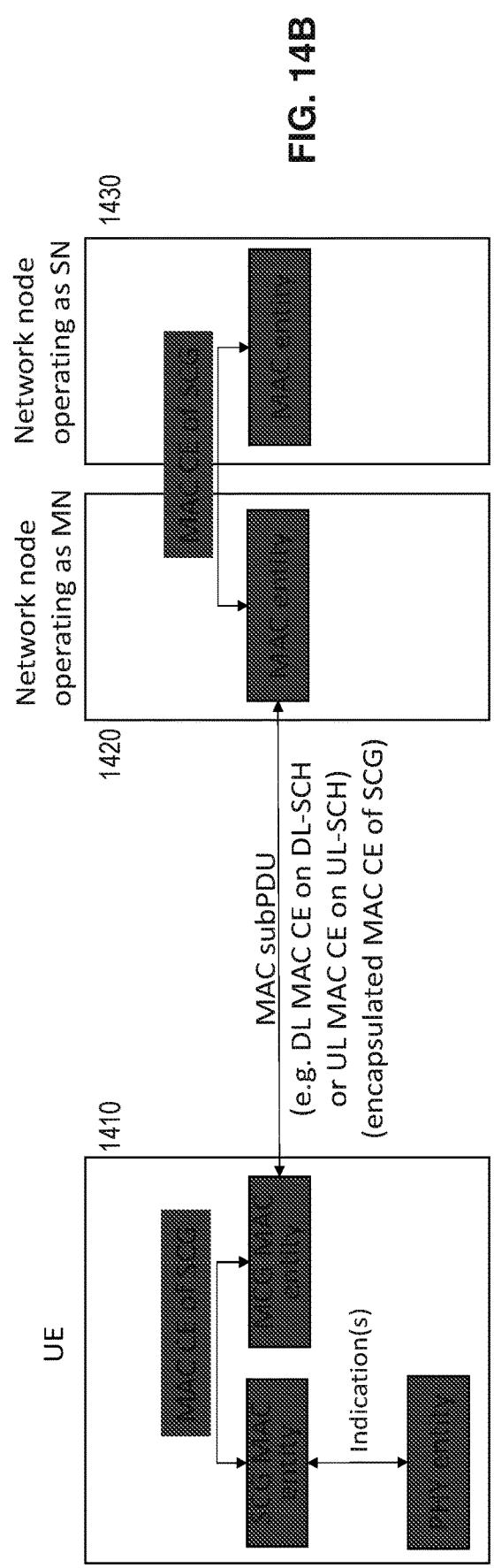

FIG. 14A illustrates UE reception of MAC sub-PDU for the legacy case where MAC entities are completely independent. FIG. 14B illustrates operation according to embodiments of the present disclosure, in which a UE (1410) receives and processes an SCG MAC CE encapsulated within an MCG MAC CE. In such case, the SCG MAC entity sends the SCG MAC CE to the MCG MAC entity via an inter-node interface (e.g., Xn) between the SN (1430) and the MN (1420), which encapsulates the SCG MAC CE and sends the resulting MCG MAC CE to the UE.

When the receiver is the network, the MN forwards the SCG MAC sub-PDU to the SN via the inter node interface, either via the Xn-AP application protocol or via RRC inter node messages. The SCG MAC entity at the SN processes the SCG MAC subheader to determine the type of payload in the MAC sub-PDU. In case the MAC sub-PDU contains a MAC CE related to the SCG, the SN processes the MAC CE according to the specifications of the SCG MAC CE (e.g., by sending an indication to the higher layers about a beam failure detected by the UE).

In other embodiments, the UE or the network receives an RRC message via the first cell group (e.g., an MCG RRC Reconfiguration via SRB1) while the second cell group (e.g., SCG) is deactivated. That RRC message can include a container for a MAC CE associated with the second (deactivated) cell group.

In other embodiments, the UE can determine that a MAC PDU received via a first cell group (e.g., MCG) and certain MAC sub-PDUs included therein (with MAC subheader and MAC CE or MAC SDU) is mapped to another cell group and/or MAC entity (e.g., SCG) based on information received via the first cell group PDCCH (e.g., DCI). As an example, the PDCCH received via the MCG includes information that the scheduled resources contain a MAC PDU with contents associated with the SCG.

In other embodiments, the UE or network determines that a MAC sub-PDU (with MAC subheader and MAC CE or MAC SDU) received via a first cell group (e.g., MCG) is a MAC sub-PDU (and/or contains a MAC CE or MAC SDU) associated with another cell group (e.g., SCG) based on another MAC CE (or information therein) that was received previously. This previous MAC CE can indicate that one or more subsequent MAC sub-PDUs (and/or the MAC CE(s) and/or MAC SDU(s) included therein) are associated with the second cell group. In one example, the previous MAC CE can include an LCID indicating that one or more subsequent MAC sub-PDUs are associated with the second cell group. For simplicity, and without limitation, the following will refer to an MCG MAC CE that indicates one or more subsequent MAC sub-PDUs are to be handled by the SCG MAC entity.

Upon reception of such a MAC CE, the UE determines that the one or more subsequent MAC sub-PDUs are to be handled by the UE SCG MAC entity. The UE SCG MAC entity at then processes the SCG MAC CE(s) (and/or MAC SDU(s)) according to the specifications of the SCG MAC CE (e.g., by sending an indication to the SCG lower layers).

Upon reception of such a MAC CE, the MN determines that the one or more subsequent MAC sub-PDUs are to be handled by the SCG MAC entity at the SN. The MN then forwards the subsequent SCG MAC sub-PDUs to the SN via the inter node interface, either via Xn-AP application protocol or via RRC inter node messages. The SCG MAC entity at the SN then processes the MAC CE(s) and/or MAC SDU(s) included therein according to the specifications of the SCG MAC CE, e.g., by forwarding received MAC SDUs to a higher layer or sending an indication to the higher layers about a beam failure detected by the UE, in case of receiving a BFR MAC CE.

According to these embodiments, a single MAC CE can be used to indicate that several subsequent MAC sub-PDUs and/or MAC CE(s) and/or MAC SDU(s) are associated with another cell group. In some alternatives, the MCG MAC CE, which indicates that the UE shall consider the following MAC sub-PDUs (and/or the MAC CE(s) and/or MAC SDU(s) included therein) to be from the SCG, includes further information, such as any combination of:

The number of subsequent MAC sub-PDUs (and/or MAC CE(s) and/or MAC SDU(s) included therein) that are associated with the SCG. In one example, the information could indicate that all the following MAC sub-PDUs (and/or MAC CEs) within the same MAC PDU are from the SCG. In another example, the information could indicate that MAC sub-PDUs in one or more subsequent MAC PDUs are associated with the SCG.

Identity of cell group that the subsequent MAC sub-PDUs (and/or the MAC CE(s) and/or MAC SDU(s) included therein) are associated with. This can be useful in case of more than two cell groups.

Whether the subsequent MAC sub-PDU(s) (and/or MAC CE(s) and/or MAC SDU(s) included therein) are from the same cell group or another cell group. As an example, in case the MAC CE is received from the MCG, it may include information whether the subsequent MAC sub-PDU(s) are from the MCG or from the SCG. This facilitates changing the indicated source of the subsequent MAC sub-PDUs between MCG (where they are received) and the SCG. Such indication can be valid in the subsequent MAC PDU or only within the same MAC PDU.

In some embodiments, the UE may require a first application time for an action or operation pertaining to a MAC CE received in the CG to which it applies (e.g., SCG MAC CE received in SCG) and a second application time for an action pertaining to a MAC CE received in a CG different from the CG to which it applies (e.g., SCG MAC CE received in MCG). For example, the second application time may be later than the first application time to account for additional MN-to-SN delay for a UE-originated confirmation (e.g., HARQ ACK) for reception of a message (e.g., MAC PDU or RRC) in one CG that carries one or more MAC CE(s) from another CG. The second application time (or difference from first application time) may be predetermined/specified or it may be network-configurable, e.g., via RRC.

Figure 15B:
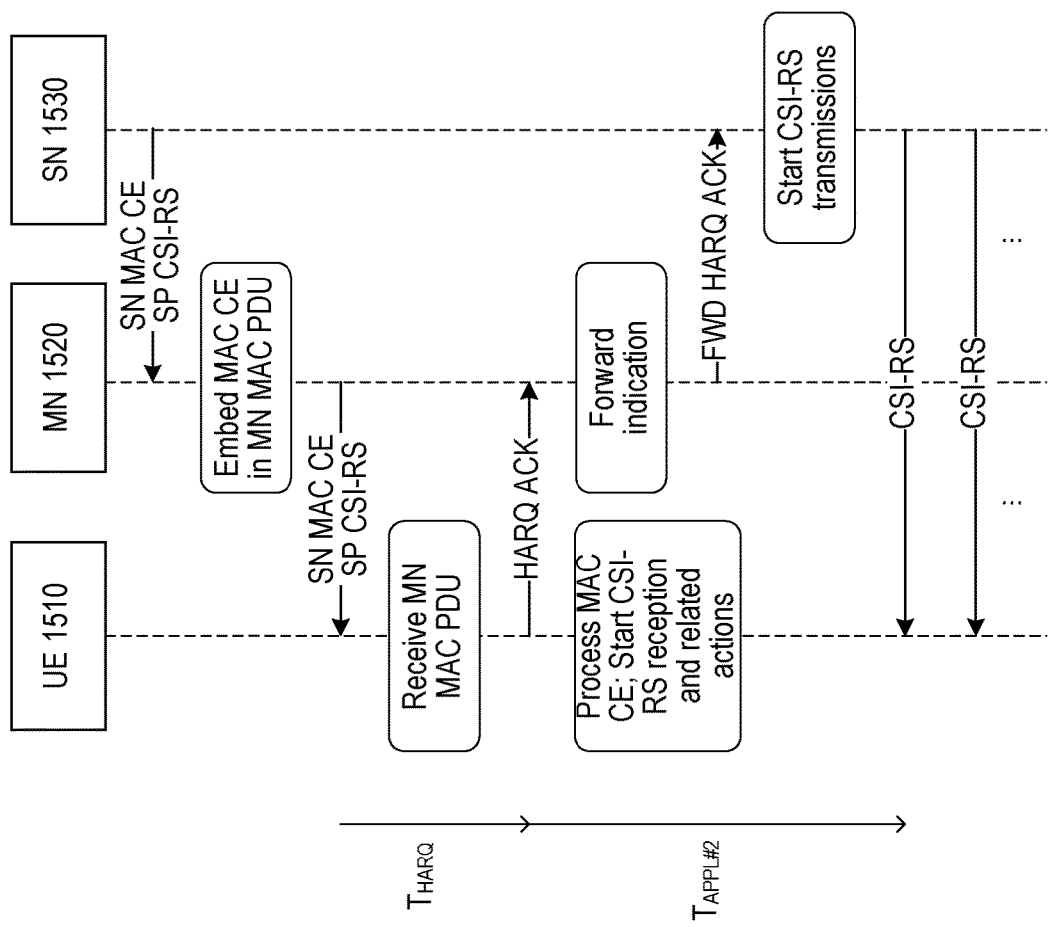
FIGS. 15A-B are signal flow diagrams that illustrate differing application times based on a cell group in which a MAC CE is received, according to various embodiments of the present disclosure.
Figure 15A:
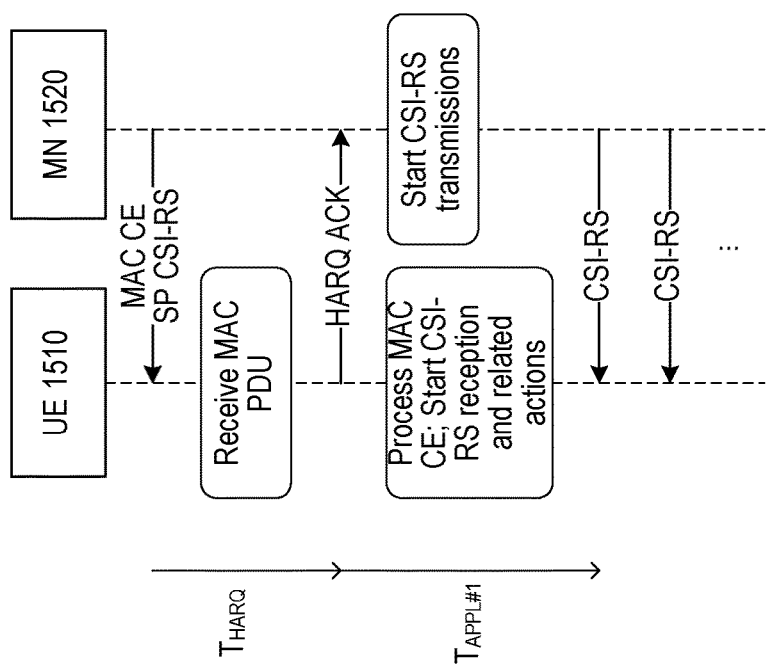

FIGS. 15A-B illustrate examples of first and second application times, according to various embodiments of the present disclosure. In particular, FIG. 15A shows a signal flow diagram between a UE (1510) and a MN (1520). In this figure, the UE receives a MAC CE for SP CSI-RS activation/deactivation in the CG (i.e., MCG) to which the MAC CE applies. This corresponds to the legacy scenario where (according to 3GPP TS 38.214) upon reception of the MAC CE in a MAC PDU carried by a PDSCH and for which an HARQ indication (HARQ ACK) is to be provided in slot n, the UE shall take corresponding actions from slot $n+3N_{slot}^{subframe,\mu}$.

FIG. 15B shows a flow diagram between the UE (1510), the MN (1520), and the SN (1530). In this figure, the UE receives a MAC CE for SP CSI-RS activation/deactivation in a different CG (i.e., MCG) than the CG to which it applies (i.e., SCG). Upon reception of the MAC CE in a MAC PDU carried by a PDSCH and for which an HARQ indication is to be provided in slot n, the UE shall take corresponding actions from slot $n+(3+X)N_{slot}^{subframe,\mu}$, with X>0.

As an example, X=10 or 20 subframes can be based on a predetermined value from a 3GPP specification text or a value configured by the network via RRC signaling. The purpose of X is to account for the additional time needed for forwarding an indication to the other CG from which the embedded MAC CE originated. During this additional time, the network can hold actions (e.g., changing transmission properties of transmitted signals such as CSI-RS) until it is confirmed that the UE has received the MAC PDU carrying the embedded MAC CE.

One advantage for X being RRC-configurable is that the MN-SN inter-node communication delay (e.g., over Xn) may differ between networks and network implementations. By having X configurable, it becomes unnecessary to specify a single value based on the largest expected inter-node delay in any network implementation. In case a predetermined value is specified, the particular value can be based on properties of MN and SN. Non-limiting examples of such properties include RAT used (e.g., LTE or NR), frequency range(s) of operation (e.g., FR1, FR2, bands, etc.), nominal transmit power, etc.

Figure 16:
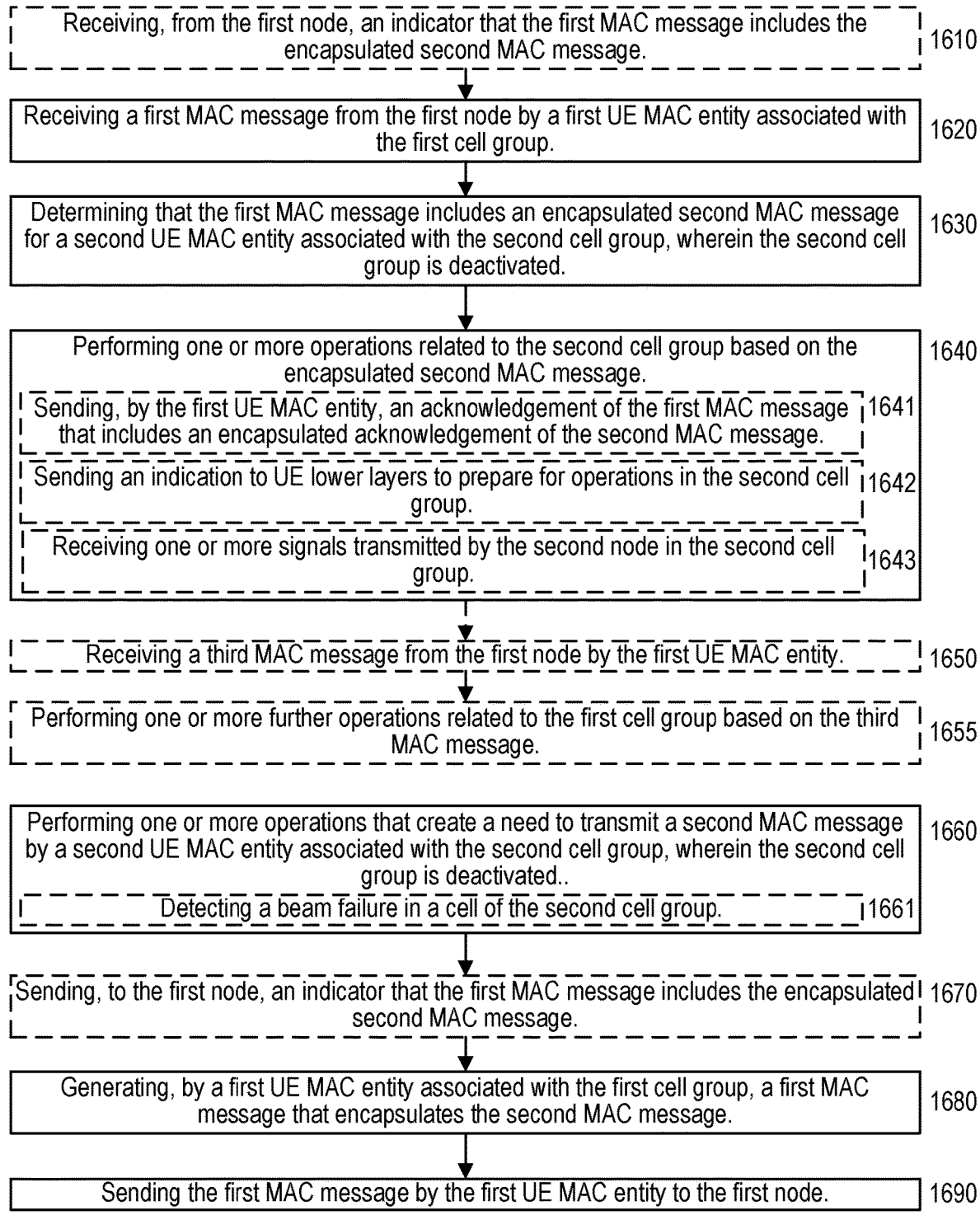
FIG. 16 is a flow diagram of an exemplary method (e.g., procedure) for a UE (e.g., wireless device, IoT device, etc. or component(s) thereof), according to various embodiments of the present disclosure.
Figure 17:
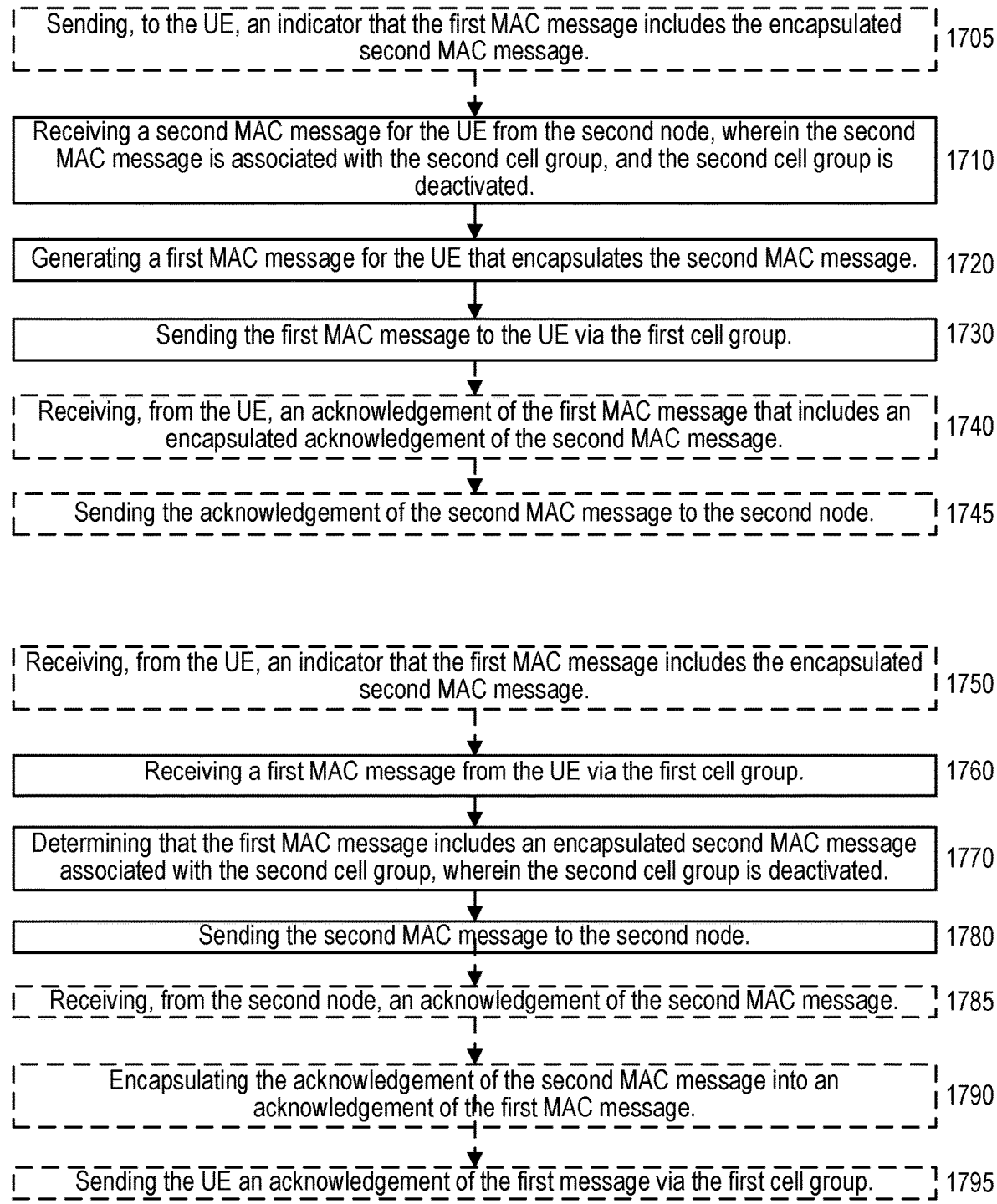
FIG. 17 is a flow diagram of an exemplary method (e.g., procedure) for a first network node (e.g., eNB, gNB, ng-eNB, en-gNB, etc. or component(s) thereof), according to various embodiments of the present disclosure.
Figure 18:
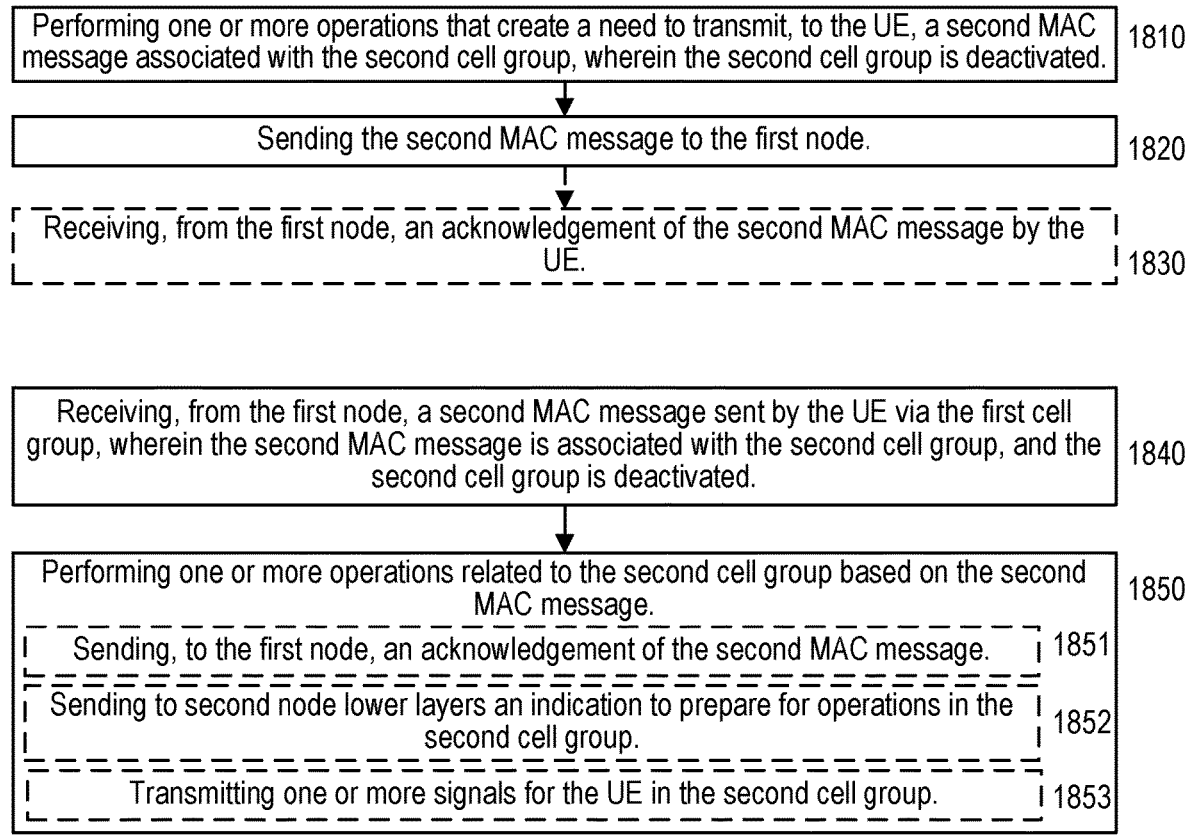
FIG. 18 is a flow diagram of an exemplary method (e.g., procedure) for a second network node (e.g., eNB, gNB, ng-eNB, en-gNB, etc. or component(s) thereof), according to various embodiments of the present disclosure.

The embodiments described above can be further illustrated with reference to FIGS. 16-18, which show exemplary methods (e.g., procedures) performed by a UE, a first node, and a second node, respectively. In other words, various features of operations described below correspond to various embodiments described above. These exemplary methods can be used cooperatively to provide various exemplary benefits and/or advantages. Although FIGS. 16-18 show specific blocks in particular orders, the operations corresponding to the blocks can be performed in different orders than shown and can be combined and/or divided into blocks having different functionality than shown. Optional blocks or operations are indicated by dashed lines.

In particular, FIG. 16 shows a flow diagram of exemplary methods (e.g., procedures) for a UE configured for DC with a wireless network via a first node arranged to provide a first cell group and a second node arranged to provide a second cell group, according to various embodiments of the present disclosure. The exemplary methods can be performed by a UE (e.g., wireless device, IoT device, modem, etc. or component thereof) such as described elsewhere herein.

In some embodiments, the exemplary method can include the operations of blocks 1620-1640. In block 1620, the UE can receive a first MAC message from the first node by a first UE MAC entity (i.e., in the UE) associated with the first cell group. In other words, the UE's first MAC entity receives the first MAC message, as discussed in more detail above. In block 1630, the UE can determine that the first MAC message includes an encapsulated second MAC message for a second UE MAC entity (i.e., in the UE) associated with the second cell group, which is deactivated. In block 1640, the UE can perform one or more operations related to the second cell group based on the second MAC message.

In some of these embodiments, performing the one or more operations in block 1630 can include any of sub-blocks 1631-1633. In sub-block 1631, the UE can send (i.e., by the first UE MAC entity) an acknowledgement of the first MAC message that includes an encapsulated acknowledgement of the second MAC message. In block 1632, the UE can send an indication to UE lower layers to prepare for operations in the second cell group. In sub-block 1633, the UE can receive one or more signals (e.g., CSI-RS) transmitted by the second node in the second cell group.

In some of these embodiments, the one or more operations related to the second cell group can be performed with a second delay. In such embodiments, the exemplary method can also include the operations of blocks 1650-1655, where the UE can receive a third MAC message from the first node by the first UE MAC entity and perform one or more further operations related to the first cell group based on the third MAC message. The one or more further operations related to the first cell group can be performed with a first delay that is less than the second delay. In some embodiments, the difference between the first delay and the second delay can be predetermined or previously configured by the first node.

In some of these embodiments, the exemplary method can also include the operations of block 1610, where the UE can receive, from the first node, an indicator that the first MAC message includes the encapsulated second MAC message. In such embodiments, determining that the first message includes the encapsulated second message (e.g., in block 1630) can be based on the indicator.

In other embodiments, the exemplary methods can include the operations of blocks 1660 and 1680-1690. In block 1660, the UE can perform one or more operations that create a need to transmit a second MAC message by a second UE MAC entity (i.e., in the UE) associated with the second cell group, which is deactivated. In block 1680, the UE can generate (i.e., by a first UE MAC entity associated with the first cell group) a first MAC message that encapsulates the second MAC message. In block 1690, the UE can send (i.e., by the first MAC entity) the first MAC message to the first node.

In some of these embodiments, performing the one or more operations in block 1660 can include the operations of sub-block 1661, where the UE can detect a beam failure in a cell of the second cell group.

In some of these embodiments, the exemplary method can also include the operations of block 1670, where the UE can send, to the first node, an indicator that the first MAC message includes the encapsulated second MAC message.

In embodiments that include the operations of block 1610 or 1670, the indicator can be included in one of the following:
- the first MAC message;
- a further MAC message, sent or received before the first MAC message, that indicates one or more subsequent MAC message elements are associated with the second cell group; or
- DCI that schedules UE reception of the first MAC message.

In some variants, the one or more subsequent MAC message elements can include one or more of the following: sub-protocol data units (PDUs), control elements (CEs), service data units (SDUs). In some variants, the indicator includes one or more of the following:
- a logical channel identifier (LCID), which indicates that one or more subsequent MAC message elements are associated with the second cell group;
- an indication of how many subsequent MAC message elements are associated with the second cell group;
- an identifier of the second cell group; and
- an indication of which subsequent MAC message elements are associated with the respective first and second cell groups.

In any of the above-described embodiments, the first node can be a master node (MN), the first cell group can be a master cell group (MCG), the second node can be a secondary node (SN), and the second cell group can be a secondary cell group (SCG).

In some embodiments, the first MAC message is a first MAC CE, the second MAC message is a second MAC CE, and the first MAC CE also includes an LCID that indicates the first MAC CE includes the second MAC CE.

In other embodiments, the first MAC message is a first MAC sub-PDU and the second MAC message is a second MAC sub-PDU. The first MAC sub-PDU also includes a first MAC subheader that includes an LCID that indicates the first MAC sub-PDU includes the second MAC sub-PDU associated with the second UE MAC entity. Likewise, the second MAC sub-PDU includes a second MAC subheader and a MAC CE or a MAC SDU associated with the second UE MAC entity. An example of these embodiments is shown in FIG. 13.

Note that the embodiments that include the operations of blocks 1610-1655 and the embodiments that include the operations of blocks 1660-1690 can be used cooperatively. More specifically, blocks 1610-1655 specify operations related to the UE receiving an encapsulated MAC message while blocks 1660-1690 specify complementary operations related to the UE sending an encapsulated MAC message based on the same technical principles.

In addition, FIG. 17 shows a flow diagram of exemplary methods (e.g., procedures) for a first node arranged to provide a first cell group to a UE configured for DC with a second node arranged to provide a second cell group to the UE, according to various embodiments of the present disclosure. The exemplary methods can be performed by a network node (e.g., base station, eNB, gNB, ng-eNB, en-gNB, etc., or components thereof) such as described elsewhere herein.

In some embodiments, the exemplary methods can include the operations of blocks 1710-1730. In block 1710, the first node receive a second MAC message for the UE from the second node. The second MAC message is associated with the second cell group, which is deactivated. In block 1720, the first node can generate a first MAC message for the UE that encapsulates the second MAC message. In block 1730, the first node can send the first MAC message to the UE via the first cell group.

In some of these embodiments, the exemplary methods can also include the operations of blocks 1740-1745. In block 1740, the first node can receive, from the UE, an acknowledgement of the first MAC message that includes an encapsulated acknowledgement of the second MAC message. In block 1745, the first node can send the acknowledgement of the second MAC message to the second node.

In some of these embodiments, the exemplary methods can also include the operations of block 1705, where the first node can send, to the UE, an indicator that the first MAC message includes the encapsulated second MAC message.

In other embodiments, the exemplary method can include the operations of blocks 1760-1780. In block 1760, the first node can receive a first MAC message via the first cell group. In block 1770, the first node can determine that the first MAC message includes an encapsulated second MAC message associated with the second cell group, which is deactivated. In block 1780, the first node can send the second MAC message to the second node.

In some of these embodiments, the exemplary method can also include the operations of block 1795, where the first node can send the UE an acknowledgement of the first MAC message via the first cell group. In some variants, the exemplary method can also include the operations of blocks 1785-1790, where the first node can receive an acknowledgement of the second MAC message from the second node and encapsulate the acknowledgement of the second MAC message into the acknowledgement of the first MAC message sent to the UE (e.g., in block 1795).

In some of these embodiments, the exemplary method can also include the operations of block 1750, where the first node can receive, from the UE, an indicator that the first MAC message includes the encapsulated second MAC message. In such case, determining that the first MAC message includes the encapsulated second MAC message (e.g., in block 1770) is based on the indicator.

In embodiments that include the operations of block 1705 or 1750, the indicator can be included in one of the following:
- the first MAC message;
- a further MAC message, sent or received before the first MAC message, that indicates one or more subsequent MAC message elements are associated with the second cell group; or
- DCI that schedules UE reception of the first MAC message.

In some variants, the one or more subsequent MAC message elements can include one or more of the following: sub- PDUs, CEs, SDUs. In some variants, the indicator includes one or more of the following:

an LCID, which indicates that one or more subsequent MAC message elements are associated with the second cell group;

an indication of how many subsequent MAC message elements are associated with the second cell group;

an identifier of the second cell group; and an indication of which subsequent MAC message elements are associated with the respective first and second cell groups.

In any of the above-described embodiments, the first node can be the MN, the first cell group can be the MCG, the second node can be the SN, and the second cell group can be the SCG.

In any of the above-described embodiments, the second MAC message can include one or more of the following:

an identifier of the second cell group;

an identifier of the UE in relation to the second cell group; and an identifier of the UE in relation to a UE MAC entity associated with the second cell group.

In some embodiments, the first MAC message is a first MAC CE, the second MAC message is a second MAC CE, and the first MAC CE also includes an LCID that indicates the first MAC CE includes the second MAC CE.

In other embodiments, the first MAC message is a first MAC sub-PDU and the second MAC message is a second MAC sub-PDU. The first MAC sub-PDU also includes a first MAC subheader that includes an LCID that indicates the first MAC sub-PDU includes the second MAC sub-PDU associated with the second UE MAC entity. Likewise, the second MAC sub-PDU includes a second MAC subheader and a MAC CE or a MAC SDU associated with the second UE MAC entity. An example of these embodiments is shown in FIG. 13.

Note that the embodiments that include the operations of blocks 1705-1745 and the embodiments that include the operations of blocks 1750-1795 can be used cooperatively. More specifically, blocks 1705-1745 specify operations related to the first node sending an encapsulated MAC message to the UE while blocks 1750-1795 specify complementary operations related to the first node receiving an encapsulated MAC message from the UE according to the same technical principles.

In addition, FIG. 18 shows a flow diagram of exemplary methods (e.g., procedures) for a second node arranged to provide a second cell group to a UE configured for DC with a first node arranged to provide a first cell group, according to various embodiments of the present disclosure. The exemplary methods can be performed by a network node (e.g., base station, eNB, gNB, ng-eNB, en-gNB, etc., or components thereof) such as described elsewhere herein.

In some embodiments, the exemplary method can include the operations of blocks 1810-1820. In block 1810, the second node can perform one or more operations that create a need to transmit, to the UE, a second MAC message associated with the second cell group, which is deactivated. In block 1820, the second node can send the second message to the first node. In some of these embodiments, the exemplary method can also include the operations of block 1830, where the second node can receive, from the first node, an acknowledgement of the second MAC message by the UE (e.g., by a second UE MAC entity associated with the second cell group).

In other embodiments, the exemplary method can include the operations of blocks 1840-1850. In block 1840, the second node can receive, from the first node, a second MAC message sent by the UE. The second MAC message is associated with the second cell group, which is deactivated. In block 1850, the second node can perform one or more operations related to the second cell group based on the second MAC message.

In some of these embodiments, performing the one or more operations in block 1850 can include any of sub-blocks 1851-1853. In sub-block 1851, the second node can send, to the first node, an acknowledgement of the second MAC message. In sub-block 1852, the second node can send an indication to second node lower layers to prepare for operations in the second cell group. In sub-block 1853, the second node can transmit one or more signals (e.g., CSI-RS) for the UE in the second cell group.

In any of the above-described embodiments, the second MAC message can include one or more of the following:

an identifier of the second cell group;

an identifier of the UE in relation to the second cell group; and an identifier of the UE in relation to a UE MAC entity associated with the second cell group.

In any of the above-described embodiments, the first node can be an MN and the first cell group is an MCG, and the second node can be an SN and the second cell group is an SCG.

Note that the embodiments that include the operations of blocks 1810-1830 and the embodiments that include the operations of blocks 1840-1850 can be used cooperatively. More specifically, blocks 1810-1830 specify operations related to the second node sending an MAC message for the UE to the first node while blocks 1840-1850 specify complementary operations related to the second node receiving a MAC message sent by the UE via the first node according to the same technical principles.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 19:
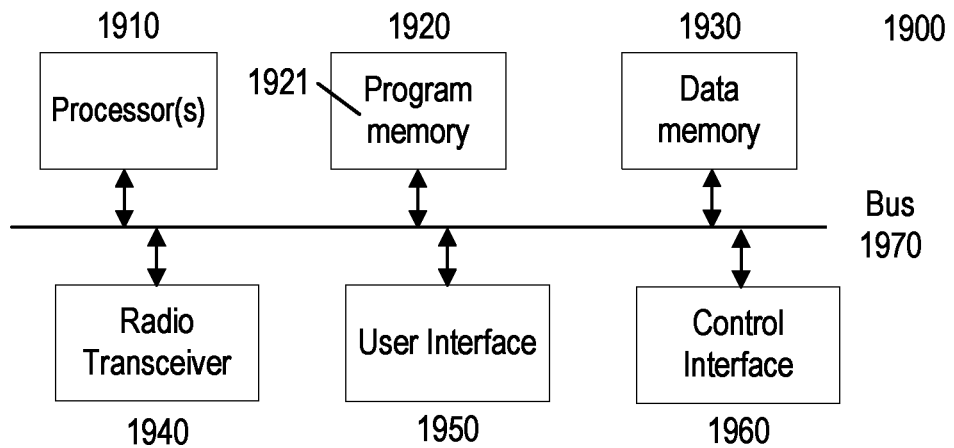
FIG. 19 shows a block diagram of an exemplary wireless device or UE, according to various embodiments of the present disclosure.

FIG. 19 shows a block diagram of an exemplary wireless device or user equipment (UE) 1900 (hereinafter referred to as "UE 1900") according to various embodiments of the present disclosure, including those described above with reference to other figures. For example, UE 1900 can be configured by execution of instructions, stored on a computer-readable medium, to perform operations corresponding to one or more of the exemplary methods described herein.

UE 1900 can include a processor 1910 (also referred to as "processing circuitry") that can be operably connected to a program memory 1920 and/or a data memory 1930 via a bus 1970 that can comprise parallel address and data buses, serial ports, or other methods and/or structures known to those of ordinary skill in the art. Program memory 1920 can store software code, programs, and/or instructions (collectively shown as computer program product 1921 in FIG. 19) that, when executed by processor 1910, can configure and/or facilitate UE 1900 to perform various operations, including operations corresponding to various exemplary methods described herein. As part of or in addition to such operations, execution of such instructions can configure and/or facilitate UE 1900 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1940, user interface 1950, and/or control interface 1960.

As another example, processor 1910 can execute program code stored in program memory 1920 that corresponds to MAC, RLC, PDCP, and RRC layer protocols standardized by 3GPP (e.g., for NR and/or LTE). As a further example, processor 1910 can execute program code stored in program memory 1920 that, together with radio transceiver 1940, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1910 can execute program code stored in program memory 1920 that, together with radio transceiver 1940, implements device-to-device (D2D) communications with other compatible devices and/or UEs.

Program memory 1920 can also include software code executed by processor 1910 to control the functions of UE 1900, including configuring and controlling various components such as radio transceiver 1940, user interface 1950, and/or control interface 1960. Program memory 1920 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1920 can comprise an external storage arrangement (not shown) remote from UE 1900, from which the instructions can be downloaded into program memory 1920 located within or removably coupled to UE 1900, so as to enable execution of such instructions.

Data memory 1930 can include memory area for processor 1910 to store variables used in protocols, configuration, control, and other functions of UE 1900, including operations corresponding to, or comprising, any of the exemplary methods described herein. Moreover, program memory 1920 and/or data memory 1930 can include non-volatile memory (e.g., flash memory), volatile memory (e.g., static or dynamic RAM), or a combination thereof. Furthermore, data memory 1930 can comprise a memory slot by which removable memory cards in one or more formats (e.g., SD Card, Memory Stick, Compact Flash, etc.) can be inserted and removed.

Persons of ordinary skill will recognize that processor 1910 can include multiple individual processors (including, e.g., multi-core processors), each of which implements a portion of the functionality described above. In such cases, multiple individual processors can be commonly connected to program memory 1920 and data memory 1930 or individually connected to multiple individual program memories and or data memories. More generally, persons of ordinary skill in the art will recognize that various protocols and other functions of UE 1900 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1940 can include radio-frequency transmitter and/or receiver functionality that facilitates the UE 1900 to communicate with other equipment supporting like wireless communication standards and/or protocols. In some exemplary embodiments, the radio transceiver 1940 includes one or more transmitters and one or more receivers that enable UE 1900 to communicate according to various protocols and/or methods proposed for standardization by 3GPP and/or other standards bodies. For example, such functionality can operate cooperatively with processor 1910 to implement a PHY layer based on OFDM, OFDMA, and/or SC-FDMA technologies, such as described herein with respect to other figures.

In some exemplary embodiments, radio transceiver 1940 includes one or more transmitters and one or more receivers that can facilitate the UE 1900 to communicate with various LTE, LTE-Advanced (LTE-A), and/or NR networks according to standards promulgated by 3GPP. In some exemplary embodiments of the present disclosure, the radio transceiver 1940 includes circuitry, firmware, etc. necessary for the UE 1900 to communicate with various NR, NR-U, LTE, LTE-A, LTE-LAA, UMTS, and/or GSM/EDGE networks, also according to 3GPP standards. In some embodiments, radio transceiver 1940 can include circuitry supporting D2D communications between UE 1900 and other compatible devices.

In some embodiments, radio transceiver 1940 includes circuitry, firmware, etc. necessary for the UE 1900 to communicate with various CDMA2000 networks, according to 3GPP2 standards. In some embodiments, the radio transceiver 1940 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1940 can include a transceiver that is capable of wired communication, such as by using IEEE 802.3 Ethernet technology. The functionality particular to each of these embodiments can be coupled with and/or controlled by other circuitry in the UE 1900, such as the processor 1910 executing program code stored in program memory 1920 in conjunction with, and/or supported by, data memory 1930.

User interface 1950 can take various forms depending on the particular embodiment of UE 1900, or can be absent from UE 1900 entirely. In some embodiments, user interface 1950 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1900 can comprise a tablet computing device including a larger touchscreen display. In such embodiments, one or more of the mechanical features of the user interface 1950 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1900 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1900 having a touch screen display are capable of receiving user inputs, such as inputs related to exemplary methods described herein or otherwise known to persons of ordinary skill.

In some embodiments, UE 1900 can include an orientation sensor, which can be used in various ways by features and functions of UE 1900. For example, the UE 1900 can use outputs of the orientation sensor to determine when a user has changed the physical orientation of the UE 1900's touch screen display. An indication signal from the orientation sensor can be available to any application program executing on the UE 1900, such that an application program can change the orientation of a screen display (e.g., from portrait to landscape) automatically when the indication signal indicates an approximate 190-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1960 of the UE 1900 can take various forms depending on the particular exemplary embodiment of UE 1900 and of the particular interface requirements of other devices that the UE 1900 is intended to communicate with and/or control. For example, the control interface 1960 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1960 can comprise an IEEE 802.3 Ethernet interface such as described above. In some exemplary embodiments of the present disclosure, the control interface 1960 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1900 can comprise more functionality than is shown in FIG. 19 including, for example, a video and/or still-image camera, microphone, media player and/or recorder, etc. Moreover, radio transceiver 1940 can include circuitry necessary to communicate using additional radio-frequency communication standards including Bluetooth, GPS, and/or others. Moreover, the processor 1910 can execute software code stored in the program memory 1920 to control such additional functionality. For example, directional velocity and/or position estimates output from a GPS receiver can be available to any application program executing on the UE 1900, including any program code corresponding to and/or embodying any exemplary embodiments (e.g., of methods) described herein.

Figure 20:
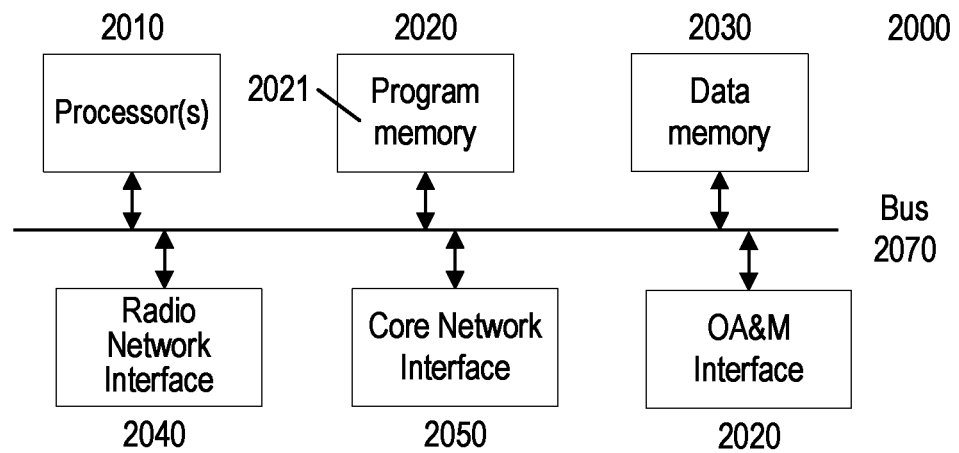
FIG. 20 shows a block diagram of an exemplary network node, according to various embodiments of the present disclosure.

FIG. 20 shows a block diagram of an exemplary network node 2000 according to various embodiments of the present disclosure, including those described above with reference to other figures. For example, exemplary network node 2000 can be configured by execution of instructions, stored on a computer-readable medium, to perform operations corresponding to one or more of the exemplary methods described herein. In some exemplary embodiments, network node 2000 can comprise a base station, eNB, gNB, or one or more components thereof. For example, network node 2000 can be configured as a central unit (CU) and one or more distributed units (DUs) according to NR gNB architectures specified by 3GPP. More generally, the functionally of network node 2000 can be distributed across various physical devices and/or functional units, modules, etc.

Network node 2000 can include processor 2010 (also referred to as "processing circuitry") that is operably connected to program memory 2020 and data memory 2030 via bus 2070, which can include parallel address and data buses, serial ports, or other methods and/or structures known to those of ordinary skill in the art.

Program memory 2020 can store software code, programs, and/or instructions (collectively shown as computer program product 2021 in FIG. 20) that, when executed by processor 2010, can configure and/or facilitate network node 2000 to perform various operations, including operations corresponding to various exemplary methods described herein. As part of and/or in addition to such operations, program memory 2020 can also include software code executed by processor 2010 that can configure and/or facilitate network node 2000 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 2040 and/or core network interface 2050. By way of example, core network interface 2050 can comprise the S1 or NG interface and radio network interface 2040 can comprise the Uu interface, as standardized by 3GPP. Program memory 2020 can also comprise software code executed by processor 2010 to control the functions of network node 2000, including configuring and controlling various components such as radio network interface 2040 and core network interface 2050.

Data memory 2030 can comprise memory area for processor 2010 to store variables used in protocols, configuration, control, and other functions of network node 2000. As such, program memory 2020 and data memory 2030 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 2010 can include multiple individual processors (not shown), each of which implements a portion of the functionality described above. In such case, multiple individual processors may be commonly connected to program memory 2020 and data memory 2030 or individually connected to multiple individual program memories and/or data memories. More generally, persons of ordinary skill will recognize that various protocols and other functions of network node 2000 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 2040 can comprise transmitters, receivers, signal processors, ASICs, antennas, beamforming units, and other circuitry that enables network node 2000 to communicate with other equipment such as, in some embodiments, a plurality of compatible user equipment (UE). In some embodiments, interface 2040 can also enable network node 2000 to communicate with compatible satellites of a satellite communication network. In some exemplary embodiments, radio network interface 2040 can comprise various protocols or protocol layers, such as the PHY, MAC, RLC, PDCP, and/or RRC layer protocols standardized by 3GPP for LTE, LTE-A, LTE-LAA, NR, NR-U, etc.;

improvements thereto such as described herein above; or any other higher-layer protocols utilized in conjunction with radio network interface 2040. According to further exemplary embodiments of the present disclosure, the radio network interface 2040 can comprise a PHY layer based on OFDM, OFDMA, and/or SC-FDMA technologies. In some embodiments, the functionality of such a PHY layer can be provided cooperatively by radio network interface 2040 and processor 2010 (including program code in memory 2020).

Core network interface 2050 can comprise transmitters, receivers, and other circuitry that enables network node 2000 to communicate with other equipment in a core network such as, in some embodiments, circuit-switched (CS) and/or packet-switched Core (PS) networks. In some embodiments, core network interface 2050 can comprise the S1 interface standardized by 3GPP. In some embodiments, core network interface 2050 can comprise the NG interface standardized by 3GPP. In some exemplary embodiments, core network interface 2050 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 2050 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 2000 can include hardware and/or software that configures and/or facilitates network node 2000 to communicate with other network nodes in a RAN, such as with other eNBs, gNBs, ng-eNBs, en-gNBs, IAB nodes, etc. Such hardware and/or software can be part of radio network interface 2040 and/or core network interface 2050, or it can be a separate functional unit (not shown). For example, such hardware and/or software can configure and/or facilitate network node 2000 to communicate with other RAN nodes via the X2 or Xn interfaces, as standardized by 3GPP.

OA&M interface 2060 can comprise transmitters, receivers, and other circuitry that enables network node 2000 to communicate with external networks, computers, databases, and the like for purposes of operations, administration, and maintenance of network node 2000 or other network equipment operably connected thereto. Lower layers of OA&M interface 2060 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 2040, core network interface 2050, and OA&M interface 2060 may be multiplexed together on a single physical interface, such as the examples listed above.

Figure 21:
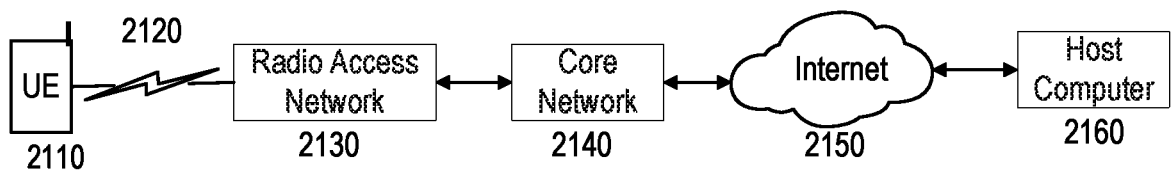
FIG. 21 shows a block diagram of an exemplary network configured to provide over-the-top (OTT) data services between a host computer and a UE, according to various embodiments of the present disclosure.

FIG. 21 is a block diagram of an exemplary communication network configured to provide over-the-top (OTT) data services between a host computer and a user equipment (UE), according to one or more exemplary embodiments of the present disclosure. UE 2110 can communicate with radio access network (RAN) 2130 over radio interface 2120, which can be based on protocols described above including, e.g., LTE, LTE-A, and 5G/NR. For example, UE 2110 can be configured and/or arranged as shown in other figures discussed above.

RAN 2130 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 2130 can cooperatively operate using licensed and unlicensed spectrum. In some embodiments, RAN 2130 can include, or be capable of communication with, one or more satellites comprising a satellite access network.

RAN 2130 can further communicate with core network 2140 according to various protocols and interfaces described above. For example, one or more apparatus (e.g., base stations, eNBs, gNBs, etc.) comprising RAN 2130 can communicate to core network 2140 via core network interface 2150 described above. In some exemplary embodiments, RAN 2130 and core network 2140 can be configured and/or arranged as shown in other figures discussed above. For example, eNBs comprising an E-UTRAN 2130 can communicate with an EPC core network 2140 via an S1 interface. As another example, gNBs and ng-eNBs comprising an NG-RAN 2130 can communicate with a 5GC core network 2130 via an NG interface.

Core network 2140 can further communicate with an external packet data network, illustrated in FIG. 21 as Internet 2150, according to various protocols and interfaces known to persons of ordinary skill in the art. Many other devices and/or networks can also connect to and communicate via Internet 2150, such as exemplary host computer 2160. In some exemplary embodiments, host computer 2160 can communicate with UE 2110 using Internet 2150, core network 2140, and RAN 2130 as intermediaries. Host computer 2160 can be a server (e.g., an application server) under ownership and/or control of a service provider. Host computer 2160 can be operated by the OTT service provider or by another entity on the service provider's behalf.

For example, host computer 2160 can provide an over-the-top (OTT) packet data service to UE 2110 using facilities of core network 2140 and RAN 2130, which can be unaware of the routing of an outgoing/incoming communication to/from host computer 2160. Similarly, host computer 2160 can be unaware of routing of a transmission from the host computer to the UE, e.g., the routing of the transmission through RAN 2130. Various OTT services can be provided using the exemplary configuration shown in FIG. 21 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 21 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible and efficient techniques that enable and/or facilitate a UE to transmit/receive a MAC message for a deactivated cell group (e.g., SCG) in another activated cell group (e.g., MCG), thereby reducing UE energy consumption by allowing the UE to refrain from monitoring PDCCH of the deactivated cell group. At the same time, by transmitting/received such MAC messages via the other cell group, the UE is prepared to (re-)activate or resume the deactivated cell group without excess delay.

When used in NR UEs (e.g., UE 2110) and gNBs (e.g., gNBs comprising RAN 2130), exemplary embodiments described herein can increase the use of data services by allowing the UE to allocate a greater portion of its stored energy for data services (e.g., eMBB) as well as to respond more quickly to intermittent use of such data services. Consequently, this increases the benefits and/or value of such data services to end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein include, but are not limited to, the following enumerated examples:

A1. A method for a user equipment (UE) configured for dual connectivity (DC) with a wireless network via a first node arranged to provide a first cell group and a second node arranged to provide a second cell group, the method comprising:
  receiving, from the first node, a first message associated with the first cell group;
  determining that the first message includes an encapsulated second message associated with the second cell group; and
  performing one or more operations related to the second cell group based on the encapsulated second message.

A2. The method of embodiment A1, wherein the one or more operations related to the second cell group include any of the following:
  sending, to the first node, an acknowledgement of the first message that includes an encapsulated acknowledgement of the second message;
  sending an indication to lower layers to prepare for operations in the second cell group; and
  receiving one or more signals transmitted by the second node in the second cell group;

A3. The method of any of embodiments A1-A2, wherein:
  the one or more operations are performed with a second delay;
  the method further comprises:
    receiving, from the first node, a third message associated with the first cell group, and
    performing one or more further operations related to the first cell group based on the third message; and
  the one or more further operations are performed with a first delay that is less than the second delay.

A4. The method of embodiment A3, wherein the difference between the first delay and the second delay is predetermined or previously configured by the first node.

A5. The method of any of embodiments A1-A4, wherein determining that the first message includes the encapsulated second message is based on one of the following:
an indicator in the first message; or
an indicator in a further message received from the first node before the first message.

A6. The method of embodiment A5, wherein the further message is one of the following:
a MAC control element (CE) that is associated with the first cell group and includes a logical channel identifier (LCID) that indicates one or more subsequent MAC sub-PDUs from the first node are associated with the second cell group; or
downlink control information (DCI) that schedules UE reception of the first message.

A7. The method of embodiment A6, wherein the MAC CE includes one or more of the following:
a number of subsequent MAC sub-PDUs that are associated with the second cell group;
an identifier of the second cell group;
indication of which subsequent MAC sub-PDUs from the first node are associated with the respective first and second cell groups.

A8. A method for a user equipment (UE) configured for dual connectivity (DC) with a wireless network via a first node that provides a first cell group and a second node that provides a second cell group, the method comprising:
performing one or more operations that create a need to transmit a second message associated with the second cell group;
generating a first message, associated with the first cell group, that encapsulates the second message; and
sending the first message to the first node.

A9. The method of embodiment A8, wherein the one or more operations related to the second cell group include detecting a beam failure in a cell of the second cell group.

A10. The method of any of embodiments A8-A9, wherein the first message that includes an indicator that the first message includes the encapsulated second message.

A11. The method of embodiments A1-A10, wherein:
the first node is a master node (MN) and the first cell group is a master cell group (MCG); and
the second node is a secondary node (SN) and the second cell group is a secondary cell group (SCG).

A12. The method of any of embodiments A1-A11, wherein:
the first and second cell groups are associated with respective first and second medium access control (MAC) entities in the UE; and
the second cell group is deactivated.

A13. The method of embodiment A12, wherein the first message is a first MAC control element (CE) that includes:
a logical channel identifier (LCID) that indicates the first MAC CE includes a second MAC CE associated with the second MAC entity; and
the second MAC CE.

A14. The method of embodiment A12, wherein the first message is a first MAC sub-protocol data unit (PDU) that includes:
a first MAC subheader that includes a logical channel identifier (LCID) that indicates the first MAC sub-PDU includes a second MAC sub-PDU associated with the second MAC entity; and
the second MAC sub-PDU, including a second MAC subheader and a MAC CE or MAC service data unit (SDU) associated with the second MAC entity.

B1. A method for a first node, of a wireless network, arranged to provide a first cell group to a user equipment (UE) configured for dual connectivity (DC) with a second node arranged to provide a second cell group in the wireless network, the method comprising:
receiving, from the second node, a second message for the UE that is associated with the second cell group;
generating a first message for the UE that encapsulates the second message; and
sending the first message to the UE via the first cell group.

B2. The method of embodiment B1, further comprising:
receiving, from the UE, an acknowledgement of the first message that includes an encapsulated acknowledgement of the second message;
transmitting the acknowledgement of the second message to the second node.

B2a. The method of any of embodiments B1-B2, further comprising sending, to the UE before the first message, a further message including an indicator that the first message includes the encapsulated second message.

B2b. The method of embodiment B2a, wherein the further message is one of the following:
a MAC control element (CE) that is associated with the first cell group and includes a logical channel identifier (LCID) that indicates one or more subsequent MAC sub-PDUs from the first node are associated with the second cell group; or
downlink control information (DCI) that schedules UE reception of the first message.

B2c. The method of embodiment B2b, wherein the MAC CE includes one or more of the following:
a number of subsequent MAC sub-PDUs that are associated with the second cell group;
an identifier of the second cell group;
indication of which subsequent MAC sub-PDUs from the first node are associated with the respective first and second cell groups.

B3. A method for a first node, of a wireless network, arranged to provides a first cell group to a user equipment (UE) configured for dual connectivity (DC) with a second node arranged to provide a second cell group in the wireless network, the method comprising:
receiving, from the UE, a first message associated with the first cell group;
determining that the first message includes an encapsulated second message associated with the second cell group; and
sending the second message to the second node.

B4. The method of embodiment B3, further comprising transmitting, to the UE, an acknowledgement of the first message.

B5. The method of any of embodiments B1-B4, wherein the second message includes one or more of the following:
an identifier of the second cell group; and
an identifier of the UE in relation to the second cell group or to a medium access control (MAC) entity associated with the second cell group.

B6. The method of embodiments B1-B5, wherein:
the first node is a master node (MN) and the first cell group is a master cell group (MCG); and
the second node is a secondary node (SN) and the second cell group is a secondary cell group (SCG).

B7. The method of any of embodiments B1-B6, wherein:
the first and second cell groups are associated with respective first and second medium access control (MAC) entities in the UE; and
the second cell group is deactivated.

B8. The method of embodiment B7, wherein the first message is a first MAC control element (CE) that includes:
a logical channel identifier (LCID) that indicates the first MAC CE includes a second MAC CE associated with the second MAC entity; and
the second MAC CE.

B9. The method of embodiment B7, wherein the first message is a first MAC sub-protocol data unit (PDU) that includes:
a first MAC subheader that includes a logical channel identifier (LCID) that indicates the first MAC sub-PDU includes a second MAC sub-PDU associated with the second MAC entity; and
the second MAC sub-PDU, including a second MAC subheader and a MAC CE or MAC service data unit (SDU) associated with the second MAC entity.

C1. A method for a second node, of a wireless network, arranged to provide a second cell group to a user equipment (UE) configured for dual connectivity (DC) with a first node arranged to provide a first cell group in the wireless network, the method comprising:
performing one or more operations that create a need to transmit, to the UE, a second message associated with the second cell group; and
sending the second message to the first node.

C2. The method of embodiment B1, further comprising receiving, from the first node, an acknowledgement of the second message by the UE.

C3. A method for a second node, of a wireless network, arranged to provide a second cell group to a user equipment (UE) configured for dual connectivity (DC) with a first node arranged to provide a first cell group in the wireless network, the method comprising:
receiving, from the first node, a second message from the UE that is associated with the second cell group; and
performing one or more operations related to the second cell group based on the second message.

C4. The method of embodiment C3, wherein the one or more operations related to the second cell group include any of the following:
sending, to the first node, an acknowledgement of the second message;
sending an indication to lower layers, of the second node, to prepare for operations in the second cell group; and
transmitting one or more signals for the UE in the second cell group.

C5. The method of any of embodiments C1-C4, wherein the second message includes one or more of the following:
an identifier of the second cell group; and
an identifier of the UE in relation to the second cell group or to a medium access control (MAC) entity associated with the second cell group.

C6. The method of embodiments C1-C5, wherein:
the first node is a master node (MN) and the first cell group is a master cell group (MCG); and
the second node is a secondary node (SN) and the second cell group is a secondary cell group (SCG).

C7. The method of any of embodiments C1-C6, wherein:
the first and second cell groups are associated with respective first and second medium access control (MAC) entities in the UE; and
the second cell group is deactivated.

D1. A user equipment (UE) configured for dual connectivity (DC) with a wireless network via a first node arranged to provide a first cell group and a second node arranged to provide a second cell group, the UE comprising:
radio transceiver circuitry configured to communicate with the wireless network via the first cell group and the second cell group; and
processing circuitry operatively coupled to the radio transceiver circuitry, whereby the processing circuitry and the radio transceiver circuitry are configured to perform operations corresponding to the methods of any of embodiments A1-A14.

D2. A user equipment (UE) configured for dual connectivity (DC) with a wireless network via a first node arranged to provide a first cell group and a second node arranged to provide a second cell group, the UE being further arranged to perform operations corresponding to any of the methods of embodiments A1-A14.

D3. A non-transitory, computer-readable medium storing computer-executable instructions that, when executed by processing circuitry of a user equipment (UE) configured for dual connectivity (DC) with a wireless network via a first node arranged to provide a first cell group and a second node arranged to provide a second cell group, configure the UE to perform operations corresponding to any of the methods of embodiments A1-A14.

D4. A computer program product comprising computer-executable instructions that, when executed by processing circuitry of a user equipment (UE) configured for dual connectivity (DC) with a wireless network via a first node arranged to provide a first cell group and a second node arranged to provide a second cell group, configure the UE to perform operations corresponding to any of the methods of embodiments A1-A14.

E1. A first node, of a wireless network, arranged to provides a first cell group to a user equipment (UE) configured for dual connectivity (DC) with a second node arranged to provide a second cell group in the wireless network, the first node comprising:
communication interface circuitry configured to communicate with the UE and with the second node; and
processing circuitry operatively coupled to the communication interface circuitry, whereby the processing circuitry and the communication interface circuitry are configured to perform operations corresponding to any of the methods of embodiments B1-B9.

E2. A first node, of a wireless network, arranged to provides a first cell group to a user equipment (UE) configured for dual connectivity (DC) with a second node arranged to provide a second cell group in the wireless network, the first node being further arranged to perform operations corresponding to any of the methods of embodiments B1-B9.

E3. A non-transitory, computer-readable medium storing computer-executable instructions that, when executed by processing circuitry of a first node, of a wireless network, arranged to provides a first cell group to a user equipment (UE) configured for dual connectivity (DC) with a second node arranged to provide a second cell group in the wireless network, configure the first node to perform operations corresponding to any of the methods of embodiments B1-B9.

E4. A computer program product comprising computer-executable instructions that, when executed by processing circuitry of a first node, of a wireless network, arranged to provides a first cell group to a user equipment (UE) configured for dual connectivity (DC) with a second node arranged to provide a second cell group in the wireless network, configure the first node to perform operations corresponding to any of the methods of embodiments B1-B9.

F1. A second node, of a wireless network, arranged to provides a second cell group to a user equipment (UE) configured for dual connectivity (DC) with a first node arranged to provide a first cell group in the wireless network, the second node comprising:
communication interface circuitry configured to communicate with the UE and with the first node; and
processing circuitry operatively coupled to the communication interface circuitry, whereby the processing circuitry and the communication interface circuitry are configured to perform operations corresponding to any of the methods of embodiments C1-C7.

F2. A second node, of a wireless network, arranged to provides a second cell group to a user equipment (UE) configured for dual connectivity (DC) with a first node arranged to provide a first cell group in the wireless network, the second node being further arranged to perform operations corresponding to any of the methods of embodiments C1-C7.

F3. A non-transitory, computer-readable medium storing computer-executable instructions that, when executed by processing circuitry of a second node, of a wireless network, arranged to provide a second cell group to a user equipment (UE) configured for dual connectivity (DC) with a first node arranged to provide a first cell group in the wireless network, configure the second node to perform operations corresponding to any of the methods of embodiments C1-C7.

F4. A computer program product comprising computer-executable instructions that, when executed by processing circuitry of a second node, of a wireless network, arranged to provide a second cell group to a user equipment (UE) configured for dual connectivity (DC) with a first node arranged to provide a first cell group in the wireless network, configure the second node to perform operations corresponding to any of the methods of embodiments C1-C7.

The invention claimed is:

1. A method for a user equipment (UE) configured for dual connectivity (DC) with a wireless network via a first node arranged to provide a first cell group and a second node arranged to provide a second cell group, the method comprising:
performing one or more operations that create a need to transmit a second medium access control (MAC) message by a second UE MAC entity associated with the second cell group, wherein the second cell group is deactivated;
generating, by a first UE MAC entity associated with the first cell group, a first MAC message that encapsulates the second MAC message; and
sending the first MAC message by the first UE MAC entity to the first node.

2. The method of claim 1, wherein performing the one or more operations include detecting a beam failure in a cell of the second cell group.

3. The method of claim 1, further comprising sending, to the first node, an indicator that the first MAC message includes the encapsulated second MAC message.

4. The method of claim 3, wherein the indicator is included in one of the following:
the first MAC message;
a further MAC message, sent or received before the first MAC message, that indicates one or more subsequent MAC message elements are associated with the second cell group; or
downlink control information (DCI) that schedules UE reception of the first MAC message.

5. The method of claim 3, wherein the indicator includes one or more of the following:
a logical channel identifier (LCID) which indicates that one or more subsequent MAC message elements are associated with the second cell group;
an indication of how many subsequent MAC message elements are associated with the second cell group;
an identifier of the second cell group; and
an indication of which subsequent MAC message elements are associated with the respective first and second cell groups.

6. The method of claim 1, wherein:
the first MAC message is a first MAC control element (CE);
the second MAC message is a second MAC CE; and
the first MAC CE also includes a logical channel identifier (LCID) that indicates the first MAC CE includes the second MAC CE.

7. The method of claim 1, wherein:
the first MAC message is a first MAC sub-protocol data unit (PDU);
the second MAC message is a second MAC sub-PDU;
the first MAC sub-PDU also includes a first MAC sub-header that includes a logical channel identifier (LCID) that indicates the first MAC sub-PDU includes the second MAC sub-PDU associated with the second UE MAC entity; and
the second MAC sub-PDU includes a second MAC subheader and a MAC CE or MAC service data unit (SDU) associated with the second UE MAC entity.

8. A method for a first node of a wireless network, the first node being arranged to provide a first cell group to a user equipment (UE) configured for dual connectivity (DC) via a second cell group provided by a second node in the wireless network, the method comprising:
receiving a first medium access control (MAC) message from the UE via the first cell group;
determining that the first MAC message includes an encapsulated second MAC message associated with the second cell group, wherein the second cell group is deactivated; and
sending the second MAC message to the second node.

9. The method of claim 8, further comprising:
receiving, from the second node, an acknowledgement of the second MAC message; and
encapsulating the acknowledgement of the second MAC message into an acknowledgement of the first MAC message; and
sending the acknowledgement of the first MAC message to the UE via the first cell group.

10. The method of claim 8, wherein:
the method further comprises receiving from the UE an indicator that the first MAC message includes the encapsulated second MAC message; and
determining that the first MAC message includes the encapsulated second MAC message is based on the indicator.

11. The method of claim 10, wherein the indicator is included in one of the following:
the first MAC message;
a further MAC message, sent or received before the first MAC message, that indicates one or more subsequent MAC message elements are associated with the second cell group; or
downlink control information (DCI) that schedules UE reception of the first MAC message.

12. The method of claim 10, wherein the indicator includes one or more of the following:
a logical channel identifier (LCID) which indicates that one or more subsequent MAC message elements are associated with the second cell group;
an indication of how many subsequent MAC message elements are associated with the second cell group;
an identifier of the second cell group; and
an indication of which subsequent MAC message elements are associated with the respective first and second cell groups.

13. The method of claim 8, wherein the second MAC message includes one or more of the following:
an identifier of the second cell group;
an identifier of the UE in relation to the second cell group; and
an identifier of the UE in relation to a UE MAC entity associated with the second cell group.

14. The method of claim 8, wherein:
the first MAC message is a first MAC control element (CE);
the second MAC message is a second MAC CE; and
the first MAC CE also includes a logical channel identifier (LCID) that indicates the first MAC CE includes the second MAC CE.

15. The method of claim 8, wherein:
the first MAC message is a first MAC sub-protocol data unit (PDU);
the second MAC message is a second MAC sub-PDU;
the first MAC sub-PDU also includes a first MAC sub-header that includes a logical channel identifier (LCID) that indicates the first MAC sub-PDU includes the second MAC sub-PDU associated with the second UE MAC entity; and
the second MAC sub-PDU includes a second MAC subheader and a MAC CE or MAC service data unit (SDU) associated with the second UE MAC entity.

16. A method for a second node of a wireless network, the second node being arranged to provide a second cell group to a user equipment (UE) configured for dual connectivity (DC) via a first cell group provided by a first node in the wireless network, the method comprising:
receiving, from the first node, a second medium access control (MAC) message sent by the UE, wherein:
the second MAC message is associated with the second cell group, and
the second cell group is deactivated; and
performing one or more operations related to the second cell group, based on the second MAC message.

17. The method of claim 16, wherein the one or more operations related to the second cell group include any of the following:
sending, to the first node, an acknowledgement of the second MAC message;
sending to second node lower layers an indication to prepare for operations in the second cell group; and
transmitting one or more signals for the UE in the second cell group.

18. The method of claim 16, wherein the second MAC message includes one or more of the following:
an identifier of the second cell group;
an identifier of the UE in relation to the second cell group; and
an identifier of the UE in relation to a UE MAC entity associated with the second cell group.

19. A user equipment (UE) configured for dual connectivity (DC) with a wireless network via a first node arranged to provide a first cell group and a second node arranged to provide a second cell group, the UE comprising:
radio transceiver circuitry configured to communicate with the wireless network via the first cell group and the second cell group; and
processing circuitry operatively coupled to the radio transceiver circuitry, whereby the processing circuitry and the radio transceiver circuitry are configured to perform operations corresponding to the method of claim 1.

20. A first node of a wireless network, the first node being arranged to provide a first cell group to a user equipment (UE) configured for dual connectivity (DC) via a second cell group provided by a second node in the wireless network, the first node comprising:
radio network interface circuitry configured to communicate with the UE and with the second node; and
processing circuitry operatively coupled to the radio network interface circuitry, whereby the processing circuitry and the radio network interface circuitry are configured to perform operations corresponding to the method of claim 8.

21. A second node of a wireless network, the second node being arranged to provide a second cell group to a user equipment (UE) configured for dual connectivity (DC) via a first cell group provided by a first node in the wireless network, the second node comprising:
radio network interface circuitry configured to communicate with the UE and with the first node; and
processing circuitry operatively coupled to the radio network interface circuitry, whereby the processing circuitry and the radio network interface circuitry are configured to perform operations corresponding to the method of claim 16.

* * * * *